United States Patent
Sumioka

(10) Patent No.: US 10,775,583 B2
(45) Date of Patent: Sep. 15, 2020

(54) CONTROL APPARATUS FOR VIBRATION-TYPE ACTUATOR, METHOD OF CONTROLLING VIBRATION-TYPE ACTUATOR, DRIVING APPARATUS, IMAGE PICKUP APPARATUS, AND AUTOMATIC STAGE

(71) Applicant: CANON KABUSHIKI KAISHA, Tokyo (JP)

(72) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 15/207,352

(22) Filed: Jul. 11, 2016

(65) Prior Publication Data

US 2017/0017058 A1 Jan. 19, 2017

(30) Foreign Application Priority Data

Jul. 14, 2015 (JP) .................... 2015-140857

(51) Int. Cl.
*G02B 7/09* (2006.01)
*G02B 21/26* (2006.01)
(Continued)

(52) U.S. Cl.
CPC .............. *G02B 7/09* (2013.01); *G02B 21/26* (2013.01); *G02B 27/646* (2013.01); *G03B 3/10* (2013.01); *G03B 5/00* (2013.01); *H02N 2/142* (2013.01); *G03B 2205/0007* (2013.01); *G03B 2205/0046* (2013.01); *G03B 2205/0061* (2013.01); *H02N 2/0015* (2013.01); *H02N 2/103* (2013.01)

(58) Field of Classification Search
CPC . H02N 2/14; G02B 7/09; G02B 21/26; G02B 27/646
USPC ............................ 310/316.1, 317, 323, 319
See application file for complete search history.

(56) References Cited

U.S. PATENT DOCUMENTS 6,084,334 A * 7/2000 Yamamoto ............... H02N 2/14
310/316.01
9,530,953 B2 * 12/2016 Yokoyama ........... H02N 2/0015
(Continued)

FOREIGN PATENT DOCUMENTS

CN 101931341 A 12/2010
CN 106685259 B 5/2019
(Continued)

OTHER PUBLICATIONS

Krishna Mainali et al., Position Tracking Performance Enhancement of Linear Ultrasonic Motor Using Iterative Learning Control, 2004 35th Annual IEEE Power Electronics Specialists Conference, pp. 4844-4849, Aachen, Germany.
(Continued)

*Primary Examiner* — Thomas M Dougherty
*Assistant Examiner* — Karen B Addison
(74) *Attorney, Agent, or Firm* — Canon U.S.A., Inc. I.P. Division

(57) ABSTRACT

A value obtained by adding an output of a speed feedforward calculation unit that uses a speed calculated from a change over time in an instruction value to a stage downstream from a feedback calculation unit that uses a positional deviation is used as a control amount, and at least one of an elliptic ratio of elliptical motion and a driving direction is controlled.

33 Claims, 17 Drawing Sheets

(51) Int. Cl.
G03B 3/10 (2006.01)
G03B 5/00 (2006.01)
G02B 27/64 (2006.01)
H02N 2/14 (2006.01)
H02N 2/10 (2006.01)
H02N 2/00 (2006.01)

(56) References Cited

U.S. PATENT DOCUMENTS

| | | | |
|---|---|---|---|
| 9,893,650 B2* | 2/2018 | Sumioka | G02B 27/646 |
| 10,355,621 B2* | 7/2019 | Sumioka | H02N 2/008 |
| 2014/0074297 A1* | 3/2014 | Sumioka | G02B 21/26 |
| | | | 700/275 |

FOREIGN PATENT DOCUMENTS

| | | |
|---|---|---|
| JP | 2004-129458 A | 4/2004 |
| JP | 2006-288004 A | 10/2006 |
| JP | 2006271110 A | 10/2006 |
| JP | 2007-209179 A | 8/2007 |
| JP | 2009201329 A | 9/2009 |
| JP | 4585346 B2 | 11/2010 |
| JP | 2014-068523 A | 4/2014 |

OTHER PUBLICATIONS

Shi Jingzhuo et al., Lyapunov Model Reference Adaptive Speed Control of Travelling Wave Ultrasonic Motor, Apr. 2011, vol. 26, No. 4, pp. 44-50, Transactions of China Electrotechnical Society, China Academic Journal Electronic Publishing House.

* cited by examiner

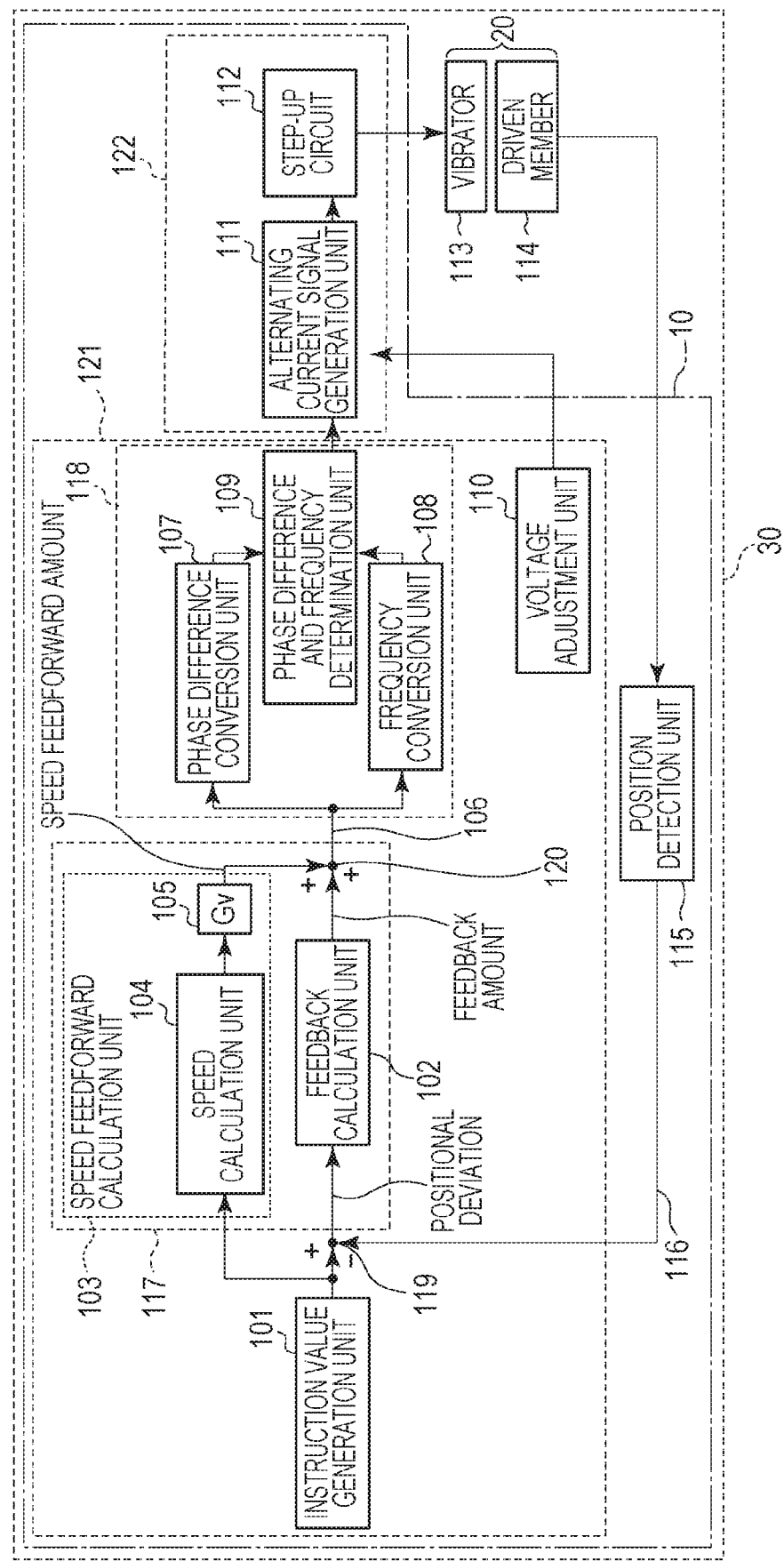

FIRST VIBRATION MODE

SECOND VIBRATION MODE

FIG. 16A
FIG. 16B
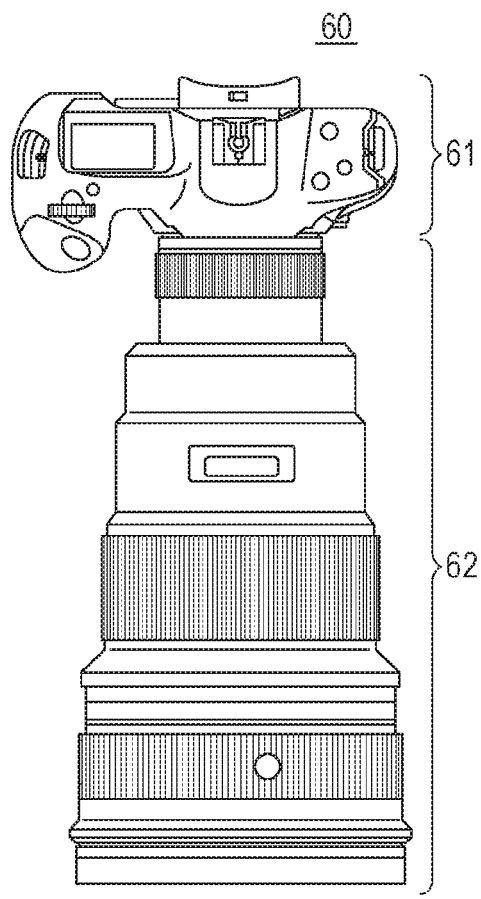
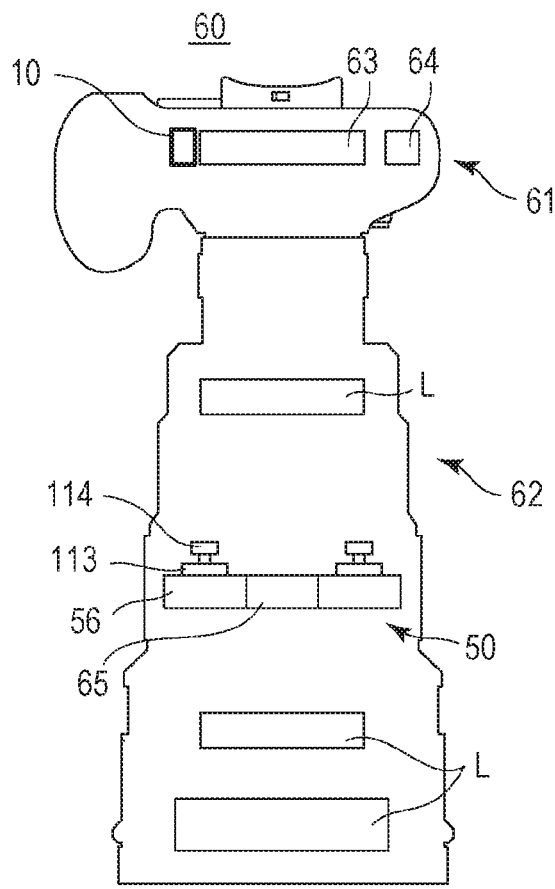

CONTROL APPARATUS FOR VIBRATION-TYPE ACTUATOR, METHOD OF CONTROLLING VIBRATION-TYPE ACTUATOR, DRIVING APPARATUS, IMAGE PICKUP APPARATUS, AND AUTOMATIC STAGE

BACKGROUND OF THE INVENTION

Field of the Invention

The present invention relates to a control apparatus for a vibration-type actuator, a method of controlling the vibration-type actuator, a driving apparatus, an image pickup apparatus, and an automatic stage.

Description of the Related Art

A vibration-type motor will be described as an example of a vibration-type actuator. A vibration-type motor is a motor of a non-electromagnetic driving type that is configured to generate a high-frequency vibration in an electro-mechanical energy conversion element, such as a piezoelectric element, coupled to an elastic member by applying an alternating current voltage to the electro-mechanical energy conversion element and to extract the vibration energy of the electro-mechanical energy conversion element in the form of continuous mechanical motion.

When a contact member serving as a driving target is to be moved to a target position at high speed in a short period of time by using a vibration-type motor, if the vibration-type motor is controlled to be driven so that the contact member is moved to the target position at high speed in a short period of time, a positional deviation associated with a following delay occurring at the time of acceleration or deceleration may deteriorate.

To address such an issue, the following control method has been proposed.

Japanese Patent No. 4585346 discloses a method of controlling the driving frequency of a vibration-type motor by combining feedforward control and feedback control. Specifically, the driving frequency is controlled by using, as a control amount, a result obtained by adding a speed feedforward value to a stage upstream from a proportional-integral-derivative (PID) controller and by successively updating the speed feedforward value in the form of table data. Japanese Patent Laid-Open No. 2004-129458 discloses a method of carrying out feedforward control by using a control amount determined through an inverse model of a vibration-type motor.

However, a control apparatus for a vibration-type motor of a conventional technique follows a configuration for typical feedforward control that is applied to an electromagnetic motor, and the electromagnetic motor is merely replaced with a vibration-type motor. Examples include a configuration in which a result obtained by adding an acceleration feedforward value to a stage downstream from a PID controller is used as a motor control amount and a configuration in which a speed feedforward value is added to a stage upstream from a PID controller. These feedforward control methods are effective for an electromagnetic motor that controls torque with an electric current.

On the other hand, an aspect of a vibration-type actuator with which the present invention deals controls driving of an actuator through the frequency or the phase difference of an alternating current voltage for driving. Thus, an aspect of the present invention can provide a feedforward control method for a vibration-type actuator such as the foregoing actuator, and the feedforward control method enables a high-speed follow-up of acceleration or deceleration in a short period of time.

SUMMARY OF THE INVENTION

One aspect of the present invention relates to a control apparatus for a vibration-type actuator. The control apparatus includes a control unit configured to generate a signal containing information for controlling a vibrator by adding a feedback amount that is obtained through at least one of integration processing and differentiation processing on the basis of a difference between a relative position of the vibrator and a contact member and an instruction value pertaining to the relative position and a speed feedforward amount that is obtained from a change over time in the instruction value. The relative position of the vibrator and the contact member is changed by driving the vibrator.

One aspect of the present invention relates to a control apparatus for a vibration-type actuator. The control apparatus includes a control unit configured to generate a signal containing information for controlling at least one of an elliptic ratio of elliptical motion generated in a driving unit of a vibrator and a driving direction of the vibrator by adding a feedback amount that is based on a difference between a relative position of the vibrator and a contact member and an instruction value pertaining to the relative position and a speed feedforward amount that is obtained from a change over time in the instruction value. The relative position of the vibrator and the contact member can be changed by driving the vibrator.

Another aspect of the present invention relates to a method of controlling a vibration-type actuator in which a vibrator is driven so as to change a relative position of the vibrator and a contact member. The method includes the steps of: obtaining a feedback amount obtained through at least one of integration processing and differentiation processing on the basis of a difference between the relative position of the vibrator and the contact member and an instruction value pertaining to the relative position; obtaining a speed feedforward amount from a change over time in the instruction value; and generating a signal containing information for controlling the vibrator by adding the feedback amount and the speed feedforward amount.

In addition, one aspect of the present invention relates to a method of controlling a vibration-type actuator in which a vibrator is driven so as to change a relative position of the vibrator and a contact member. The method includes the steps of: obtaining a feedback amount obtained on the basis of a difference between the relative position of the vibrator and the contact member and an instruction value pertaining to the relative position; obtaining a speed feedforward amount from a change over time in the instruction value; and generating a signal containing information for controlling at least one of an elliptic ratio of elliptical motion generated in a driving unit of the vibrator and a driving direction of the vibrator by adding the feedback amount and the speed feedforward amount.

Furthermore, one aspect of the present invention relates to a control apparatus for a vibration-type actuator. The control apparatus includes a control unit configured to generate a signal containing information for controlling at least one of an elliptic ratio of elliptical motion generated in a driving unit of a vibrator and a driving direction of the vibrator by adding a feedback amount that is based on a difference between a relative position of the vibrator and a contact member and an instruction value pertaining to the relative position and a speed feedforward amount that is obtained from a change over time in the instruction value. The relative position of the vibrator and the contact member can be changed by driving the vibrator.

Further features of the present invention will become apparent from the following description of exemplary embodiments with reference to the attached drawings.

BRIEF DESCRIPTION OF THE DRAWINGS

FIG. 1 illustrates an example of a control apparatus for a vibration-type actuator according to a first exemplary embodiment of the present invention.

FIG. 16A is a plan view illustrating an external appearance of an image pickup apparatus serving as an application example of a control apparatus according to an exemplary embodiment of the present invention, and FIG. 16B is a schematic diagram illustrating an internal structure of the image pickup apparatus.

DESCRIPTION OF THE EMBODIMENTS

First Exemplary Embodiment

An example of a vibration-type actuator that is applicable to the present invention will be described with reference to the drawings. A vibration-type actuator 20 according to the present exemplary embodiment includes a vibrator and a contact member.

Figure 2A:
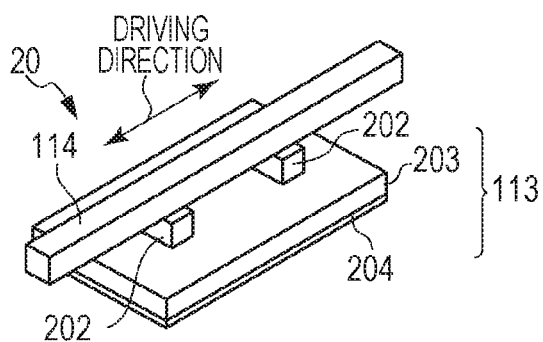
FIGS. 2A through 2D are illustrations for describing a driving principle of an example of a linear-drive vibration-type actuator.
Figure 2B:
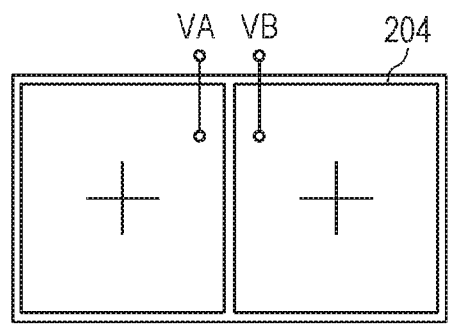
Figure 2C:
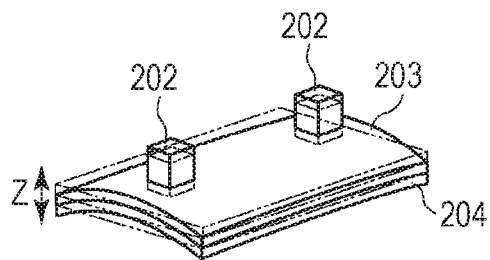
Figure 2D:
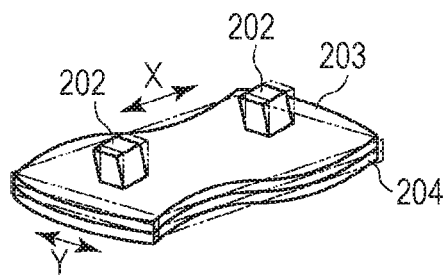

FIGS. 2A through 2D are illustrations for describing a driving principle of a linear-drive vibration-type motor serving as an example of the vibration-type actuator. A vibration-type motor illustrated in FIG. 2A includes a vibrator 113 and a contact member 114. The vibrator 113 includes an elastic member 203 and a piezoelectric element 204, which is as an electro-mechanical energy conversion element, bonded to the elastic member 203. The contact member 114 is driven by the vibrator 113. An alternating current voltage is applied to the piezoelectric element 204. Thus, two vibration modes such as those illustrated in FIGS. 2C and 2D are generated, and the contact member 114 that is in pressure-contact with projection portions 202 is moved in the directions indicated by the arrows.

FIG. 2B illustrates an electrode pattern of the piezoelectric element 204, and electrode regions that are equally divided into two in the lengthwise direction are formed in the piezoelectric element 204 of the vibrator 113, for example. The polarization directions of the electrode regions are identical (+). An alternating current voltage (VB) is applied to one of the two electrode regions of the piezoelectric element 204 that is located on the right side in FIG. 2B, and an alternating current voltage (VA) is applied to the other electrode region located on the left side.

When the alternating current voltages VB and VA have a frequency near the resonant frequency of a first vibration mode and are of the same phase, the entirety (the two electrode regions) of the piezoelectric element 204 extends at one moment and shrinks at another moment. As a result, a vibration in the first vibration mode illustrated in FIG. 2C is generated in the vibrator 113. Through this, displacement in a thrusting direction (Z-direction) is generated in the projection portions 202.

Meanwhile, when the alternating current voltages VB and VA have a frequency near the resonant frequency of a second vibration mode and are out of phase by 180 degrees relative to each other, the electrode region on the right side of the piezoelectric element 204 shrinks and the electrode region on the left side extends at one moment. This relationship is reversed at another moment. As a result, a vibration in the second vibration mode illustrated in FIG. 2D is generated in the vibrator 113. Through this, displacement in a driving direction (feeding direction, X-direction) is generated in the projection portions 202.

Accordingly, by applying alternating current voltages having frequencies near the resonant frequencies of the first and second vibration modes to the electrodes of the piezoelectric element 204, a vibration in which the first and second vibration modes are combined can be generated.

In this manner, as the two vibration modes are combined, the projection portions 202 undergoes elliptical motion along a section perpendicular to the Y-direction (the direction perpendicular to the X-direction and the Z-direction) indicated in FIG. 2D. This elliptical motion causes the contact member 114 to be driven in the direction indicated by the arrow in FIG. 2A. The direction in which the contact member 114 moves relative to the vibrator 113, or in other words, the direction in which the contact member 114 is driven by the vibrator 113 (X-direction in this example) is referred to as the driving direction.

The ratio of occurrences of the first vibration mode and the second vibration mode can be changed by varying the phase difference of the alternating current voltages input to the equally divided two electrodes. In this vibration-type motor, the speed of the contact member can be changed by changing the ratio of occurrences of the first vibration mode and the second vibration mode.

Although a case in which the vibrator 113 is stationary and the contact member 114 moves has been described as an example in the foregoing description, the present invention is not limited to this mode. It is sufficient that the positions of portions of the contact member 114 and of the vibrator 113 at which the contact member 114 and the vibrator 113 make contact with each other change relative to each other. For example, the contact member 114 may be fixed, and the vibrator 113 may move. Alternatively, the contact member 114 and the vibrator 113 may both move. In other words, in the present invention, the term "to drive" means to change the relative position of the contact member and the vibrator, and it is not required that the position of the contact member (e.g., the position of the contact member with the position of a housing that houses the contact member and the vibrator serving as a reference) change.

A vibration-type actuator is used, for example, for autofocus driving of a camera. Autofocus driving requires high-accuracy positioning control, and position feedback control with the use of a sensor is carried out, for example. The speed of the vibration-type actuator can be controlled by adjusting the frequency of an alternating current voltage applied to the piezoelectric element, the phase difference of a two-phase signal, the pulse duration, and so on. For example, the vibration amplitude increases as the driving frequency is brought closer to the resonant frequency of the piezoelectric element, and a lens serving as a driving target can be driven at high speed.

The positioning control in the autofocus driving will be described. A focusing lens driven by the vibration-type actuator is controlled such that the focusing lens is accelerated to a predetermined speed from a start position by the control apparatus, driven at a constant speed, decelerated as the focusing lens approaches a target position, and is then stopped. Typically, it is desired that the focusing speed be high, and thus the vibration-type actuator is controlled so that the focusing lens moves to the target position at high speed in a short period of time. In this case, the positional deviation associated with a following delay at the time of acceleration or deceleration may deteriorate. With the use of the control apparatus for a vibration-type actuator according to the present exemplary embodiment, however, deterioration in the positional deviation associated with a following delay at the time of acceleration of deceleration can be suppressed.

Figure 3:
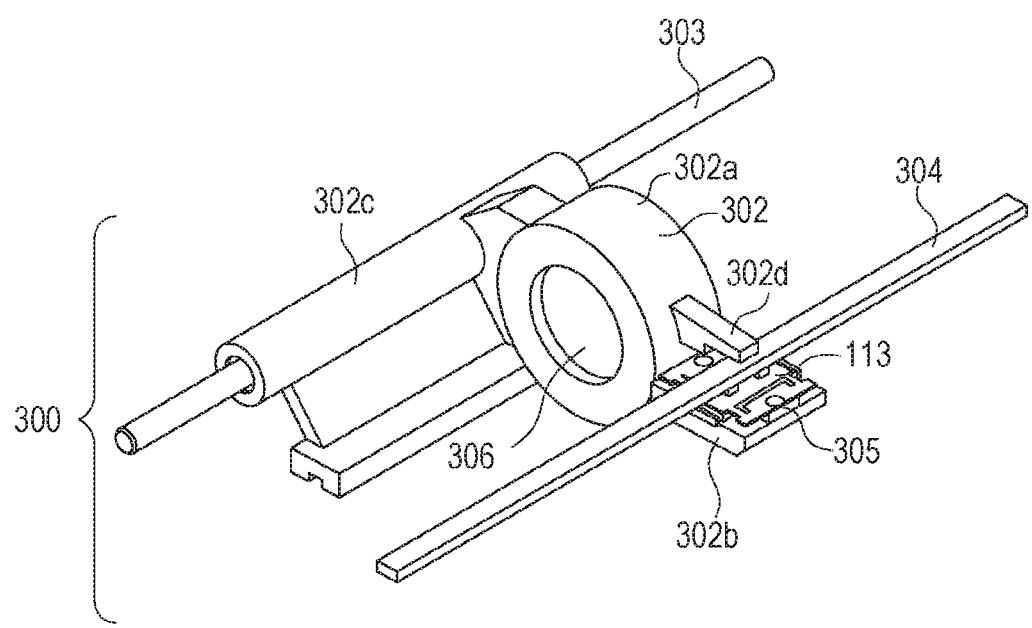
FIG. 3 is an illustration for describing an example of a lens driving mechanism of a lens barrel.

FIG. 3 is an illustration for describing a lens driving mechanism of a lens barrel according to the present exemplary embodiment. The driving mechanism for a lens holder to be driven by a vibration-type actuator includes a vibrator, a lens holder, and first and second guide bars that are configured to slidably hold the lens holder and that are disposed parallel to each other. In the present exemplary embodiment, a case in which the second guide bar serves as a contact member, the second guide bar is fixed, and the vibrator and the lens holder integrally move will be described.

The vibrator generates a relative movement force between the vibrator and the second guide bar that makes contact with a projection portion of an elastic member through elliptical motion of the projection portion of the vibrator generated as a driving voltage is applied to an electromechanical energy conversion element. Through this, the lens holder, which is integrally fixed to the vibrator, can be moved along the first and second guide bars.

Specifically, a driving mechanism 300 for the contact member includes a lens holder 302, which is primarily a lens holding member, a lens 306, a vibrator 113 to which a flexible printed circuit is coupled, a pressurizing magnet 305, two guide bars 303 and 304, and a base member (not illustrated). In the following description, the vibrator 113 serves as an example of the aforementioned vibrator.

The two ends of each of the first guide bar 303 and the second guide bar 304 are held by and fixed to the base member (not illustrated) so that the first guide bar 303 and the second guide bar 304 are disposed parallel to each other. The lens holder 302 includes a cylindrical holder portion 302a, a holding portion 302b that holds and fixes the vibrator 113 and the pressurizing magnet 305, and a first guide portion 302c into which the first guide bar 303 is fitted so as to function as a guide.

The pressurizing magnet 305, which constitutes a pressurizing unit, includes a permanent magnet and two yokes disposed at the respective ends of the permanent magnet. A magnetic circuit is formed between the pressurizing magnet 305 and the second guide bar 304, and an attractive force is generated between the pressurizing magnet 305 and the second guide bar 304. The pressurizing magnet 305 and the second guide bar 304 are disposed with a gap provided therebetween, and the second guide bar 304 is disposed so as to be in contact with the vibrator 113.

The aforementioned attractive force generates a pressurizing force between the second guide bar 304 and the vibrator 113. Two projection portions of the elastic member make pressure-contact with the second guide bar 304 so as to form a second guide portion. The second guide portion forms a guide mechanism with the use of the attractive force of magnetism, which may lead to a situation in which the vibrator 113 and the second guide bar 304 are pulled apart from each other by an external force or the like. To address such a situation, the following measure is taken.

Specifically, a fall prevention portion 302d provided on the lens holder 302 abuts against the second guide bar 304, and thus the lens holder 302 is placed back to a desired position. As a desired alternating current voltage signal is applied to the vibrator 113, a driving force is generated between the vibrator 113 and the second guide bar 304, and this driving force drives the lens holder.

FIG. 1 illustrates a driving apparatus that includes a vibration-type actuator and a control apparatus for the vibration-type actuator according to a first exemplary embodiment of the present invention. A driving apparatus 30 includes a vibration-type actuator 20 and a control apparatus 10 for the vibration-type actuator 20. The vibration-type actuator 20 includes a vibrator 113 and a contact member 114, and the control apparatus 10 includes a control unit 121 and a driving unit 122.

The control unit 121 includes an instruction value generation unit 101, a control amount generation unit 117, and a control parameter generation unit 118 and is configured to be capable of generating a signal containing information for controlling the vibrator 113 by adding a feedback amount and a speed feedforward amount in an adder 120. The feedback amount is obtained on the basis of a difference between an instruction value pertaining to a relative position of the vibrator 113 and the contact member 114 and the stated relative position. The speed feedforward amount is an amount corresponding to the speed obtained from a change over time in the stated instruction value.

The control amount generation unit 117 includes a feedback calculation unit 102 and a speed feedforward calculation unit 103. The control parameter generation unit 118 includes, for example, a phase difference conversion unit 107, a frequency conversion unit 108, and a phase difference and frequency determination unit 109.

The control unit 121 will be described in further detail. The instruction value generation unit 101 generates an instruction value for the relative position (116) of the vibrator 113 and the contact member 114 at each time point. A subtractor 119 calculates the difference between the instruction value and the relative position (116) of the vibrator 113 and the contact member 114 detected by a position detection unit 115, and this difference serves as a positional deviation. The positional deviation is input to the feedback calculation unit 102, and the feedback amount is output. The feedback calculation unit 102 may be constituted, for example, by a PID arithmetic operator, but this is not a limiting example. For example, the feedback amount can also be obtained through H-infinity control or the like.

The instruction value is input to the speed feedforward calculation unit 103, and the speed feedforward amount is output. The speed feedforward calculation unit 103 includes a speed calculation unit 104 and a multiplier 105. The speed calculation unit 104 takes a time derivative of the instruction value so as to convert the instruction value to the speed. The multiplier 105 multiplies the speed by a speed feedforward gain (Gv). In the present exemplary embodiment, a control amount (106) of the vibration-type actuator is a value obtained by adding the speed feedforward amount to the feedback amount.

Herein, the instruction value pertaining to the relative position of the vibrator and the contact member is a value pertaining to the relative position that is output from the instruction value generation unit at each time point, and the instruction value generation unit outputs, for example, one instruction value per instance of position control sampling. Now, the position control sampling will be described with the case illustrated in FIG. 1 serving as an example. The position control sampling refers to a cycle starting from acquiring a first deviation and the speed feedforward amount, inputting an alternating current signal to the vibrator, detecting the relative position or the relative speed of the vibrator and the contact member, to a point immediately before the next instance of acquiring the first deviation and the speed feedforward amount starts.

To be more specific, the position control sampling refers, for example, to the following cycle in FIG. 1. The first deviation is acquired from an instruction value and a detection signal, and the feedback amount is obtained from the first deviation. In addition, the speed feedforward amount is obtained from the instruction value. The feedback amount and the speed feedforward amount are added to obtain the control amount. A control parameter is obtained from the obtained control amount, an alternating current signal corresponding to the control parameter is applied to the vibrator through a step-up circuit so as to drive the vibrator, and the relative speed or the relative position of the vibrator and the contact member is detected as a detection signal.

The cycle, described above, starting from acquiring the first deviation and the speed feedforward amount to the point before the next instance of acquiring the first deviation and the speed feedforward amount is referred to as the position control sampling.

The instruction value pertaining to the relative position does not have to be obtained on the basis of the relative position detected by the position detection unit. Alternatively, the relative speed may be detected, and the instruction value may be obtained from the detected relative speed.

The target position pertaining to the relative position of the vibrator and the contact member is the relative position to which the vibrator and the contact member are to be brought in the end and is a value that is not updated at each instance of the position control sampling.

Referring to FIG. 1, the control amount (106) is input to the control parameter generation unit 118, and an output of the control parameter generation unit 118 is input to an alternating current signal generation unit 111. The control parameter generation unit 118 can be constituted, for example, by the phase difference conversion unit 107, the frequency conversion unit 108, and the phase difference and frequency determination unit 109. In the control parameter generation unit 118, the phase difference conversion unit 107 and the frequency conversion unit 108 convert the control amount (106) to the phase difference and the frequency, respectively, that serve as control parameters of the alternating current voltage signal for driving the vibration-type actuator. The phase difference and frequency determination unit 109 of the control parameter generation unit 118 outputs the phase difference and the frequency on the basis of the control amount, which will be described later, and the driving speed and the driving direction of the vibration-type actuator are controlled.

The alternating current signal generation unit 111 generates a two-phase alternating current signal on the basis of the information on the phase difference and the frequency included in the output of the control parameter generation unit 118 and the pulse duration information from a voltage adjustment unit 110. The alternating current signal is stepped up to a desired driving voltage by a step-up circuit 112 constituted by a coil, a transformer, and so on. The stepped-up alternating current signal is applied to a piezoelectric element of the vibrator 113, and the contact member 114 is driven. The position detection unit outputs the relative position of the vibrator 113 and the contact member 114.

The position detection unit includes, for example, a position sensor or a speed sensor and a relative position output unit configured to obtain the relative position for the control on the basis of an output from the position sensor or the speed sensor and to output the obtained relative position. The position sensor (or the speed sensor) is mounted to the vibrator 113 or the contact member 114 and detects the relative position (or the relative speed) of the vibrator 113 and the contact member 114.

The relative position is fed back to the feedback calculation unit 102 and are simultaneously fed forward to the speed feedforward calculation unit 103, and thus the vibration-type actuator is controlled so as to follow the instruction value at each time point. Although the present exemplary embodiment is described with an example of a two-phase driving control apparatus that is driven with a piezoelectric element, which is an electro-mechanical energy conversion element, being divided into two phases, the present invention is not limited to a two-phase driving vibration-type actuator and can also be applied to a vibration-type actuator of two or more phases.

Figure 4:
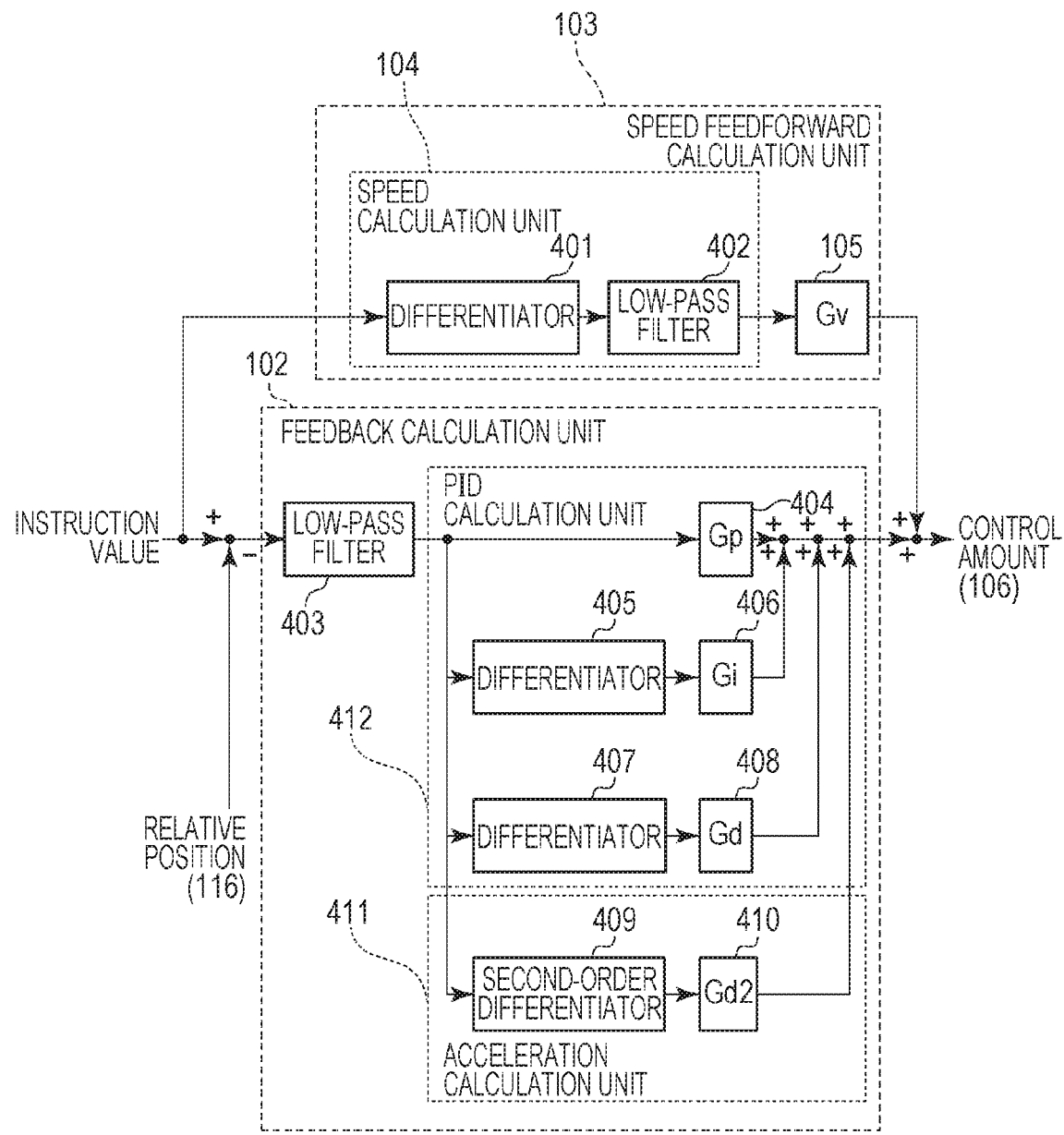
FIG. 4 illustrates a configuration example of a control amount calculation unit according to an exemplary embodiment of the present invention.

Next, each of the units will be described in detail. FIG. 4 illustrates configurations of the speed feedforward calculation unit and the feedback calculation unit according to the present exemplary embodiment. The speed feedforward calculation unit 103 will be described first. The speed calculation unit 104 is constituted by a differentiator 401 and a low-pass filter 402. An instruction value input to the speed calculation unit 104 is converted to the speed, and noise is removed by the filter. Thereafter, the multiplier 105 multiplies the output of the speed calculation unit 104 by the speed feedforward gain Gv and outputs the result as the speed feedforward amount.

The feedback calculation unit 102 will be described next. The feedback calculation unit 102 according to the present exemplary embodiment includes a low-pass filter 403, an acceleration calculation unit 411, and a PID calculation unit 412. The low-pass filter 403 is used to remove noise included in the detected relative position. The low-pass filter 403 may be provided at a stage downstream from the PID calculation unit 412.

The PID calculation unit 412 includes a proportional term (P), an integral term (I) that carries out integration processing, and a derivative term (D) that carries out differentiation processing. In the proportional term (P), a multiplier 404 multiplies the output of the low-pass filter 403 by a proportional gain Gp. In the integral term (I), the output of the low-pass filter 403 is input to an integrator 405, and a multiplier 406 multiplies the output of the integrator 405 by an integral gain Gi. In the derivative term (D), the output of the low-pass filter 403 is input to a differentiator 407, and a multiplier 408 multiplies the output of the integrator 407 by a derivative gain Gd.

The processing order of the integrator 405 and the multiplier 406 in the integral term (I) may be reversed, and the processing order of the differentiator 407 and the multiplier 408 in the derivative term (D) may be reversed. The PID calculation unit 412 adds the outputs of the proportional term, the integral term, and the derivative term and outputs the result, and the PID calculation unit 412 is used to compensate for a phase delay or the gain of a control target and to constitute a stable, high-accuracy control system.

In the present exemplary embodiment, the acceleration calculation unit 411 is provided in order to further stabilize the control system. The acceleration calculation unit 411 includes a second derivative term (D2) and includes a second-order differentiator 409 and a multiplier 410 that multiplies the output of the second-order differentiator 409 by a second derivative gain Gd2. The processing order of the second-order differentiator 409 and the multiplier 410 in the second derivative term (D2) may also be reversed. An output value of the second-order differentiator is a value corresponding to the acceleration, and the responsiveness in a high-frequency range can thus be increased.

Although a typical PID arithmetic operator is used in the present exemplary embodiment, this is not a limiting example, and an arithmetic operator in which one of the integral term and the derivative term is omitted or a robust controller of H-infinity control or the like may instead be used. In addition, the low-pass filter is not a limiting example, and a different type of filter may be used, or a filter does not need to be used. In addition, the second-order differentiator is not an essential component.

Figure 5A:
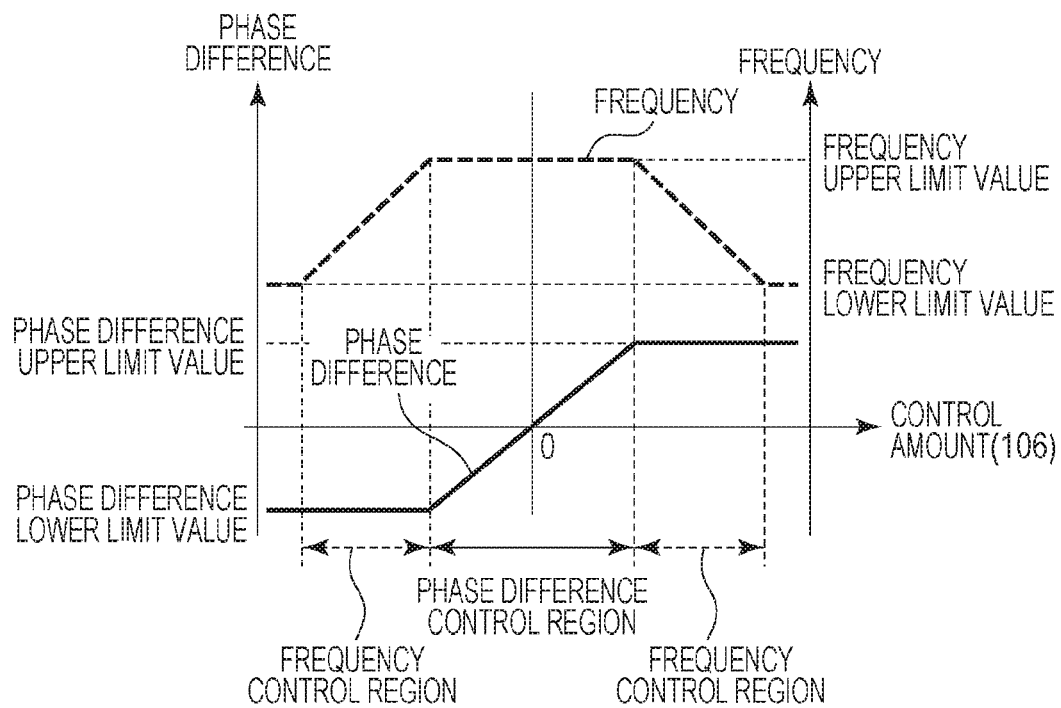
FIGS. 5A and 5B are illustrations for describing an output example of a phase difference and frequency determination unit according to an exemplary embodiment of the present invention.
Figure 5B:
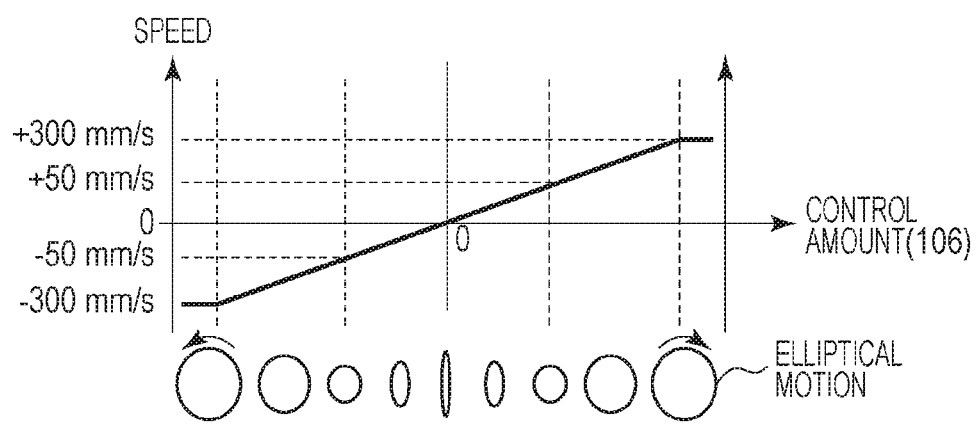

FIGS. 5A and 5B are illustrations for describing an output of the phase difference and frequency determination unit according to the present exemplary embodiment. FIG. 5A illustrates the phase difference and the frequency that are output on the basis of the control amount. The horizontal axis indicates the control amount (106), the vertical axis on the left indicates the phase difference, and the vertical axis on the right indicates the frequency. In this manner, the phase difference and frequency determination unit of the control parameter generation unit controls the phase difference and the frequency such that the phase difference changes in a region in which the absolute value of the control amount is small (phase difference control region). In addition, the phase difference and frequency determination unit controls the frequency and the phase difference such that the frequency changes in a region in which the absolute value of the control amount is large (frequency control region). In other words, the phase difference and frequency determination unit is configured to switch between the driving based on the phase difference and the control based on the frequency in accordance with the control amount.

Specifically, in the phase difference control region, the frequency is fixed at a frequency upper limit value, and the phase difference varies between a phase difference upper limit value and a phase difference lower limit value (e.g., between +110 degrees and −110 degrees). Thus, reversal of the driving direction, pausing, and the speed in a low-speed region are controlled. In the frequency control region, the phase difference is fixed at the phase difference lower limit value or the phase difference upper limit value, and the frequency varies between the frequency upper limit value and a frequency lower limit value (e.g., between 92 kHz and 89 kHz). Thus, the speed in a high-speed region is controlled.

FIG. 5B illustrates the speed of the vibration-type actuator that is based on the control amount. The horizontal axis indicates the control amount (106), and the vertical axis indicates the speed. As described above, the vibration-type actuator is controlled through phase difference control in the low-speed region of −50 mm/s to +50 mm/s and controlled through frequency control in the high-speed region excluding the low-speed region. In the phase difference control, as illustrated in FIG. 5B, as the phase difference is controlled, the elliptic ratio of the elliptical motion of the driving unit changes, and as the sign of the phase difference is reversed, the direction of the elliptical motion changes. In addition, when the elliptical motion takes a vertically elongated shape of which elliptic ratio is 0, the speed is 0.

In the meantime, in the frequency control, as the frequency is controlled, the elliptic amplitude changes while the elliptic ratio of the elliptical motion remains constant. Through the control described above, the phase difference and the frequency are set in the control parameter generation unit 118 such that the speed is as linear as possible with respect to the control amount.

Figure 6A:
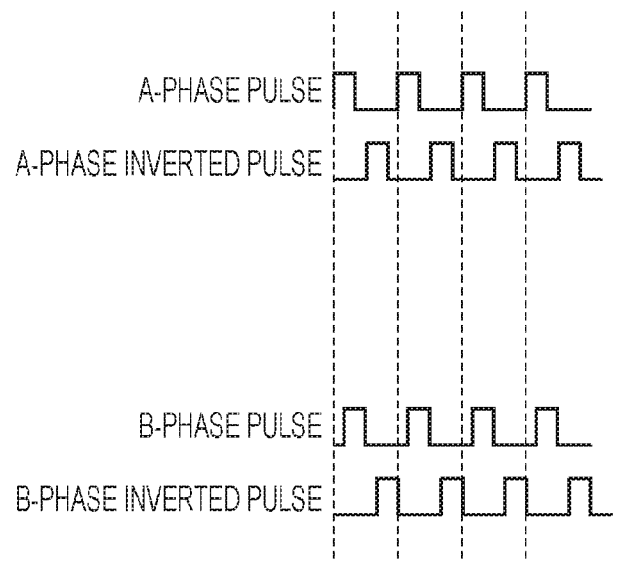
FIGS. 6A and 6B illustrate a configuration example of a driving unit according to an exemplary embodiment of the present invention.
Figure 6B:
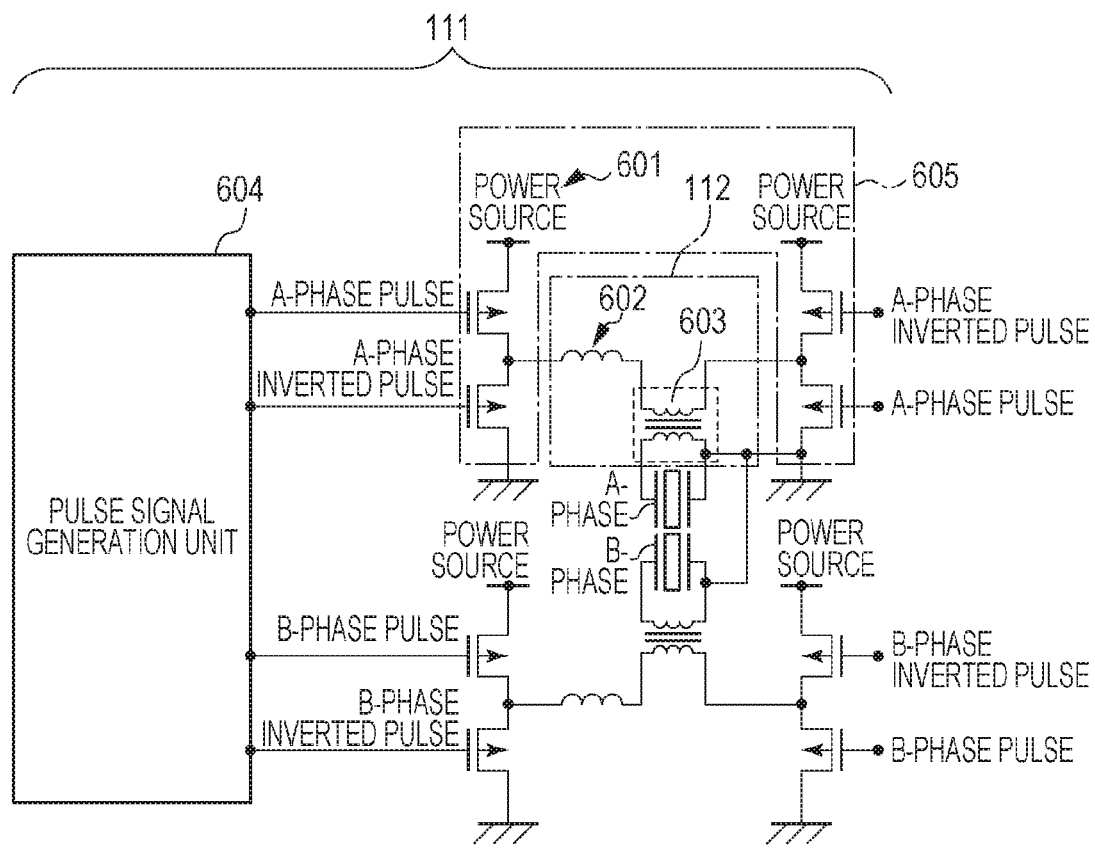

FIGS. 6A and 6B illustrate a configuration example of the driving unit 122. In the present exemplary embodiment, the driving unit 122 includes the alternating current signal generation unit 111 and the step-up circuit 112. FIG. 6A illustrates a two-phase alternating current pulse signal output from the alternating current signal generation unit 111. The alternating current signal generation unit 111 includes, for example, a pulse signal generation unit 604 and a switching circuit 605. FIG. 6B illustrates the alternating current signal generation unit 111 and the step-up circuit 112 that applies an alternating current voltage signal to a piezoelectric element.

In a specific example, a part of the alternating current signal generation unit that generates an alternating current voltage to be applied to an A-phase piezoelectric element will be described. The same configuration can be employed for a part that generates an alternating current voltage to be applied to a B-phase piezoelectric element. The pulse signal generation unit 604 generates a first A-phase pulse signal and a first A-phase inverted pulse signal that contain phase difference information and frequency information corresponding to the phase difference information and the frequency information, respectively, output from the phase difference and frequency determination unit. The first A-phase pulse signal and the first A-phase inverted pulse signal, which are input pulse signals, are input to the switching circuit 605. The switching circuit 605 subjects a direct current voltage supplied from a power source 601 to switching operation at timings of the input pulse signals and generates a rectangular-wave alternating current voltage signal.

The step-up circuit 112 is constituted, for example, by a coil 602 and a transformer 603. The step-up circuit 112 receives an input of the rectangular-wave alternating current voltage signal and applies, to the A-phase piezoelectric element, a sine-wave alternating current voltage signal stepped up to a predetermined driving voltage. In a similar manner, a sine-wave alternating current voltage signal stepped up to a predetermined driving voltage is applied to the B-phase piezoelectric element.

The control unit 121 is constituted, for example, by a digital device, such as a central processing unit (CPU) or a programmable logic device (PLD) (including an application specific integrated circuit (ASIC)) and an element, such as an A/D converter. In addition, the alternating current signal generation unit 111 of the driving unit 122 includes, for example, a CPU, a function generator, and a switching circuit, and the step-up circuit is constituted, for example, by a coil and a transformer. It is to be noted that the control unit and the driving unit do not each have to be constituted by a single element or a single circuit. The control unit and the driving unit may each include a plurality of elements or a plurality of circuits. In addition, each of the processes may be executed by any element or circuit.

Figure 7A:
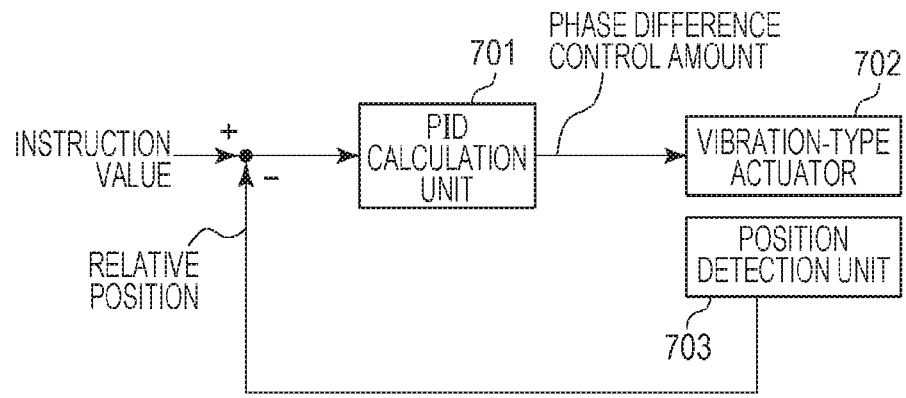
FIG. 7A is a schematic block diagram of a driving apparatus according to a first comparative example.
Figure 7B:
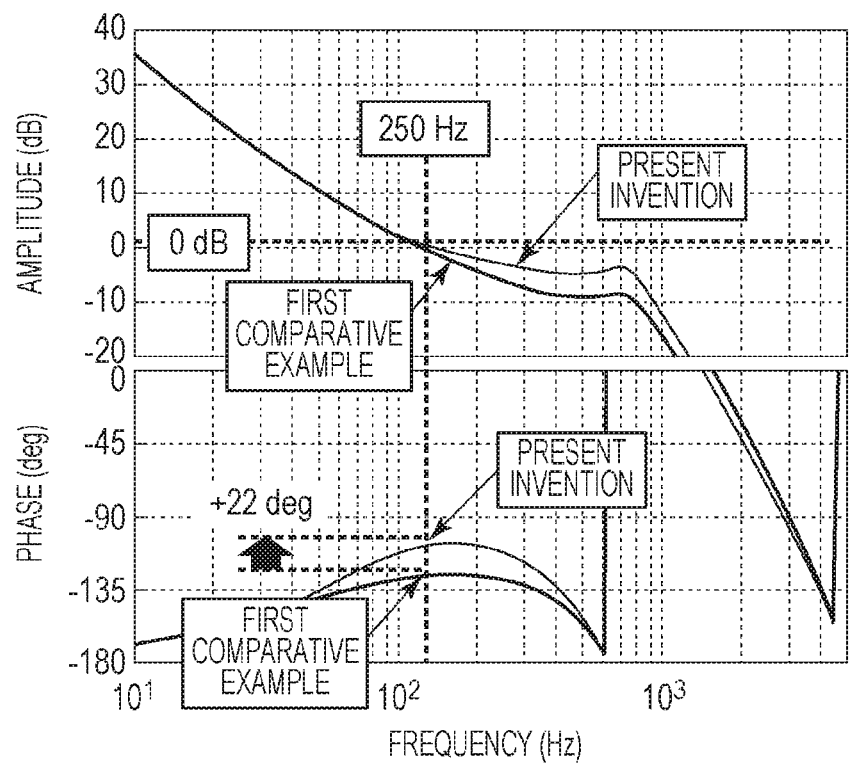
FIG. 7B is a Bode diagram of an open-loop transfer function according to the present exemplary embodiment and the first comparative example.

FIG. 7A is a schematic block diagram of a driving apparatus according to a first comparative example, and FIG. 7B is a Bode diagram of an open-loop transfer function pertaining to the driving apparatus according to the present exemplary embodiment and the driving apparatus according to the first comparative example. The first comparative example is a configuration in which feedback control with the use of only a PID calculation unit 701 is employed. FIG. 7A is a schematic control block diagram of the driving apparatus according to the first comparative example and illustrates, in the form of a simplified block diagram, a system for driving a vibration-type actuator 702 with an output of the PID calculation unit 701 serving as a phase difference control amount. In this example, the transfer function is derived by using a control model, and thus an alternating current signal generation unit and a step-up circuit, which have little influence on the result, are omitted. The relative position output from a position detection unit 703 is obtained through calculation by using a phase difference and speed transfer function model of the vibration-type actuator 702.

FIG. 7B is a Bode diagram of the open-loop transfer function from an instruction value to the relative position, and the driving apparatus according to the present exemplary embodiment and the driving apparatus according to the first comparative example are compared in terms of the frequency characteristics of the gain and the phase. Here, the control gains of the PID calculation unit 701 are set as follows: Gp=0.16, Gi=0.007, and Gd=0.53. The control gains of the PID calculation unit 412 according to the present exemplary embodiment are set to the same values, and the feedforward gain Gv is set to 0.5. A comparison of the phase characteristics at a frequency of 250 Hz at which the gain of the open loop characteristics is 0 dB reveals that the phase margin improves by 22 degrees in the present exemplary embodiment as compared to that in the first comparative example. In other words, the comparison reveals that the phase delay improves through the feedforward control and the responsiveness to the instruction value improves in the present exemplary embodiment. It is to be noted that the comparison is made while a sufficient gain margin is secured in both cases for frequencies at which the phase delay exceeds 180 degrees. Here, with respect to the phase characteristics, the phase delay is smaller and the responsiveness is higher as the value is closer to 0 degrees, and the control becomes impossible when the value exceeds 180 degrees. In FIG. 7B, the graph is turned around to the positive side near −180 degrees, and this is merely that the graph is displayed as being inverted by 180 degrees and indicates that the control is not possible. It has also been found that the advantageous effects of the present exemplary embodiment can be obtained in a similar manner even when the control gains of the PID calculation unit are changed to other values.

Figure 8A:
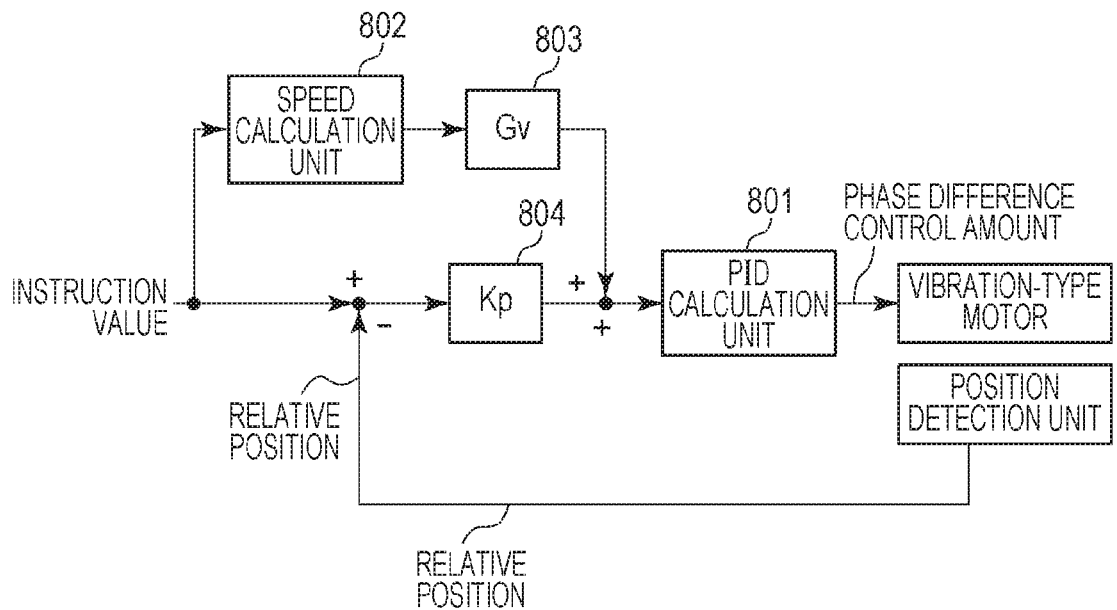
FIG. 8A is a schematic block diagram of a driving apparatus according to a second comparative example.
Figure 8B:
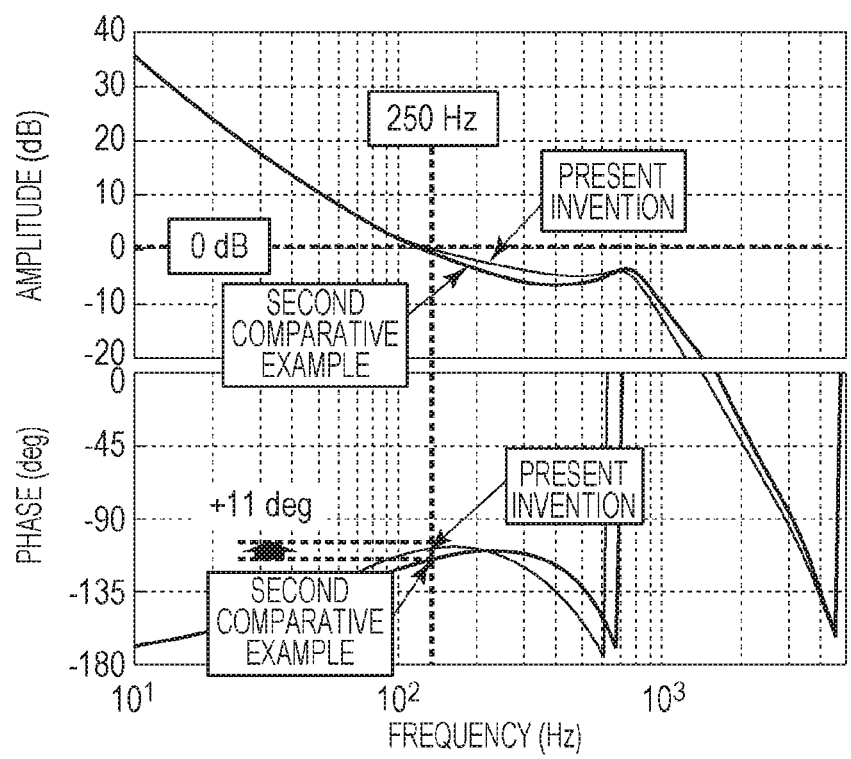
FIG. 8B is a Bode diagram of an open-loop transfer function according to the present exemplary embodiment and the second comparative example.

FIG. 8A is a schematic block diagram of a driving apparatus according to a second comparative example, and FIG. 8B is a Bode diagram of an open-loop transfer function pertaining to the driving apparatus according to the present exemplary embodiment and the driving apparatus according to the second comparative example.

FIG. 8A is a schematic control block diagram of the driving apparatus according to the second comparative example. The second comparative example is control in which a PID calculation unit 801 and a speed feedforward calculation unit (802, 803) are used but differs from the present exemplary embodiment in terms of the configuration. In other words, the amount calculated by a speed calculation unit 802 and a multiplier 803 that multiplies by the speed feedforward gain Gv is added to a stage upstream from the PID calculation unit 801. In addition, a multiplier 804 that multiplies by a proportional gain Kp is provided at a stage upstream from the PID calculation unit 801, and Kp is set to 1. However, Kp does not have to be provided. The control gains of the PID calculation unit 801 are set to the same values as those described with reference to FIGS. 7A and 7B.

FIG. 8B is a Bode diagram of the open-loop transfer function from an instruction value to the relative position, and the driving apparatus according to the present exemplary embodiment and the driving apparatus according to the second comparative example are compared in terms of the frequency characteristics of the gain and the phase. The speed feedforward gain Gv in the second comparative example is adjusted such that the control system does not oscillate and the gain is raised to the maximum, and the speed feedforward gain Gv is thus set to 2.5. In contrast, the speed feedforward gain (Gv) is 0.5 in the present exemplary embodiment. The comparison reveals that the phase margin improves by 11 degrees at a frequency of 250 Hz in the driving apparatus according to the present exemplary embodiment as compared to that in the driving apparatus according to the second comparative example and that the responsiveness to the instruction value improves. It is to be noted that the gain margin of frequencies at which the phase delay exceeds 180 degrees is adjusted to the same value in both cases.

Figure 9A:
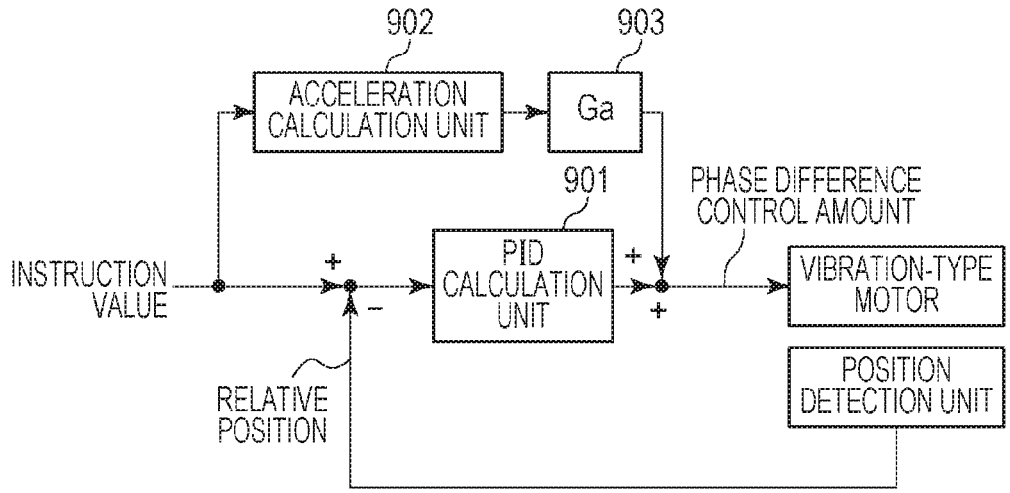
FIG. 9A is a schematic block diagram of a driving apparatus according to a third comparative example.
Figure 9B:
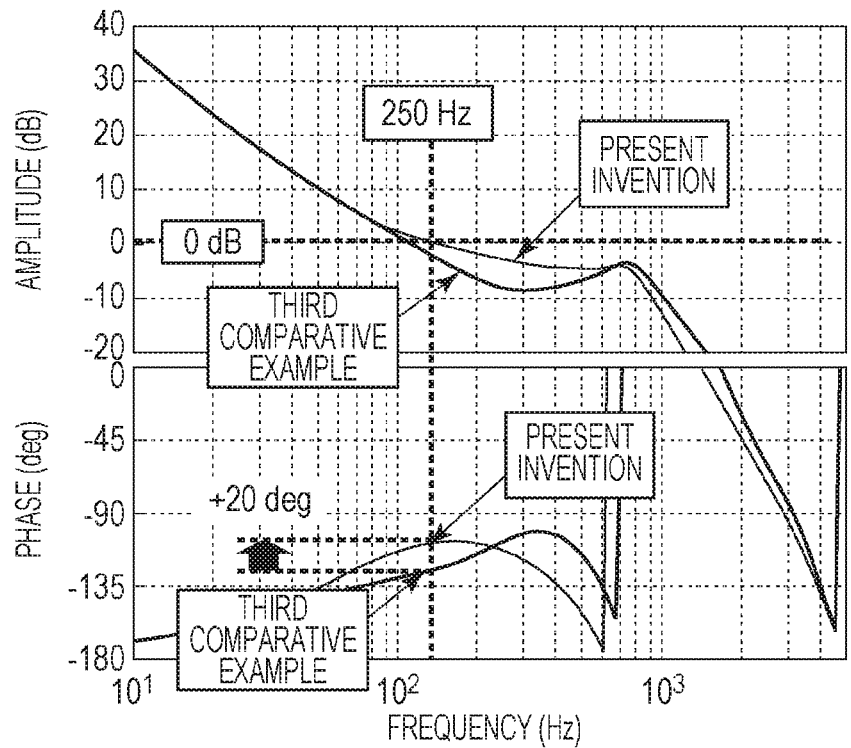
FIG. 9B is a Bode diagram of an open-loop transfer function according to the present exemplary embodiment and the third comparative example.

FIG. 9A is a schematic block diagram of a driving apparatus according to a third comparative example, and FIG. 9B is a Bode diagram of an open-loop transfer function pertaining to the driving apparatus according to the present exemplary embodiment and the driving apparatus according to the third comparative example.

FIG. 9A is a schematic control block diagram of the driving apparatus according to the third comparative example. The third comparative example is control in which a PID calculation unit 901 and an acceleration feedforward calculation unit (902, 903) are used. The driving apparatus according to the third comparative example differs from the driving apparatus according to the present exemplary embodiment in that the acceleration, instead of the speed, is fed forward. The amount calculated by an acceleration calculation unit 902 and a multiplier 903 that multiplies by an acceleration feedforward gain Ga is added to a stage downstream from the PID calculation unit 901, and the result serves as a control amount for the phase difference. The control gains of the PID calculation unit 901 are set to the same values as those described with reference to FIGS. 7A and 7B.

FIG. 9B is a Bode diagram of the open-loop transfer function from an instruction value to the relative position, and the driving apparatus according to the present exemplary embodiment and the driving apparatus according to the third comparative example are compared in terms of the frequency characteristics of the gain and the phase. The acceleration feedforward gain Ga in the third comparative example is adjusted such that the control system does not oscillate and the gain is raised to the maximum, and the acceleration feedforward gain Ga is thus set to 2.0. In contrast, the feedforward gain is 0.5 in the present exemplary embodiment. The phase margin improves by 20 degrees at a frequency of 250 Hz in the driving apparatus according to the present exemplary embodiment as compared to that in the driving apparatus according to the third comparative example, and the responsiveness to the instruction value can be improved. It is to be noted that the gain margin of frequencies at which the phase delay exceeds 180 degrees is adjusted to the same value in both cases.

Figure 10:
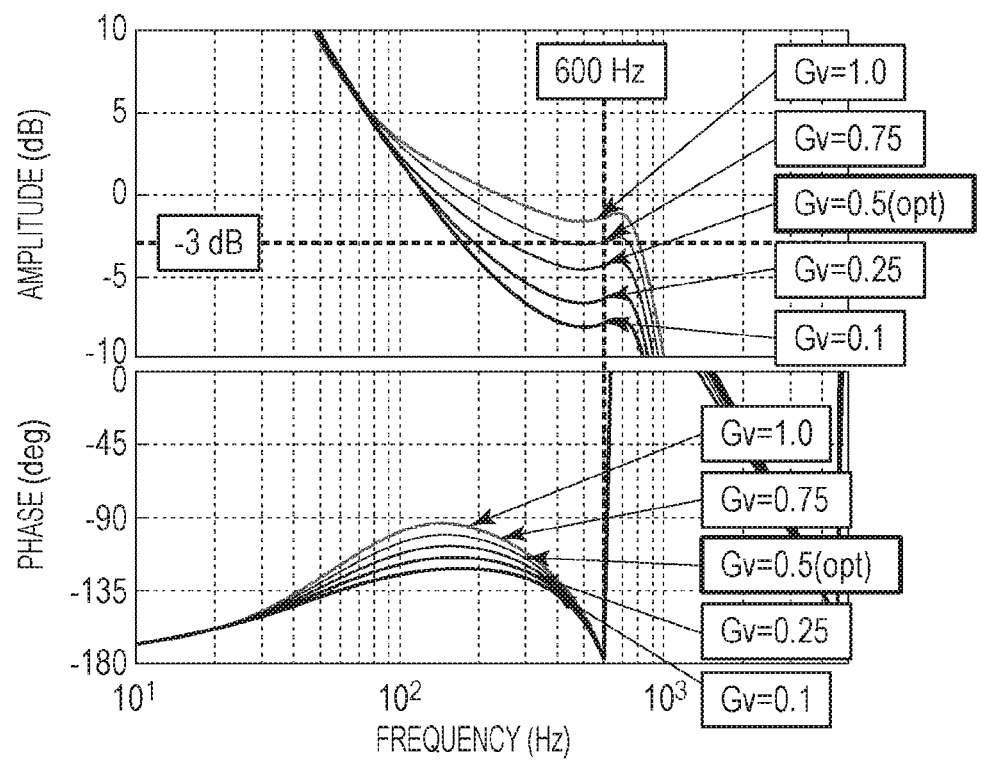
FIG. 10 is a Bode diagram of an open-loop transfer function in which a feedforward gain is varied according to the first exemplary embodiment.

FIG. 10 is a Bode diagram of an open-loop transfer function in which the feedforward gain is varied in the first exemplary embodiment. The feedforward gain (Gv) is adjusted from 0.1 to 1.0, and an optimal value for the gain at which the control system does not oscillate and the gain can be raised to the maximum is obtained. Here, at frequencies at which the phase delay exceeds 180 degrees, it is desirable that the gain be set to less than −3 dB so that the control system does not oscillate. As can be seen from FIG. 10, in order to set the gain to less than −3 dB at a frequency of 600 Hz at which the phase delay exceeds 180 degrees, it is preferable that Gv be no greater than 0.7, and it is more preferable that Gv be no greater than 0.5. Meanwhile, the derivative gain Gd of the PID calculation unit 412 is 0.53, and thus by setting the feedforward gain to a value equal to or less than the derivative gain, the control system can be prevented from oscillating even at frequencies at which the phase delay exceeds 180 degrees. Even when the derivative gain of the PID calculation unit 412 is set to a different gain, it is sufficient that the relationship of Gv≤Gd hold true in a similar manner, and this relationship can be applied in a broad range. The reason for this is as follows. The derivative term of the PID is an amount corresponding to the speed, and it is considered that a relationship that is well balanced with the speed feedforward gain provides an optimal effect.

Figure 11:
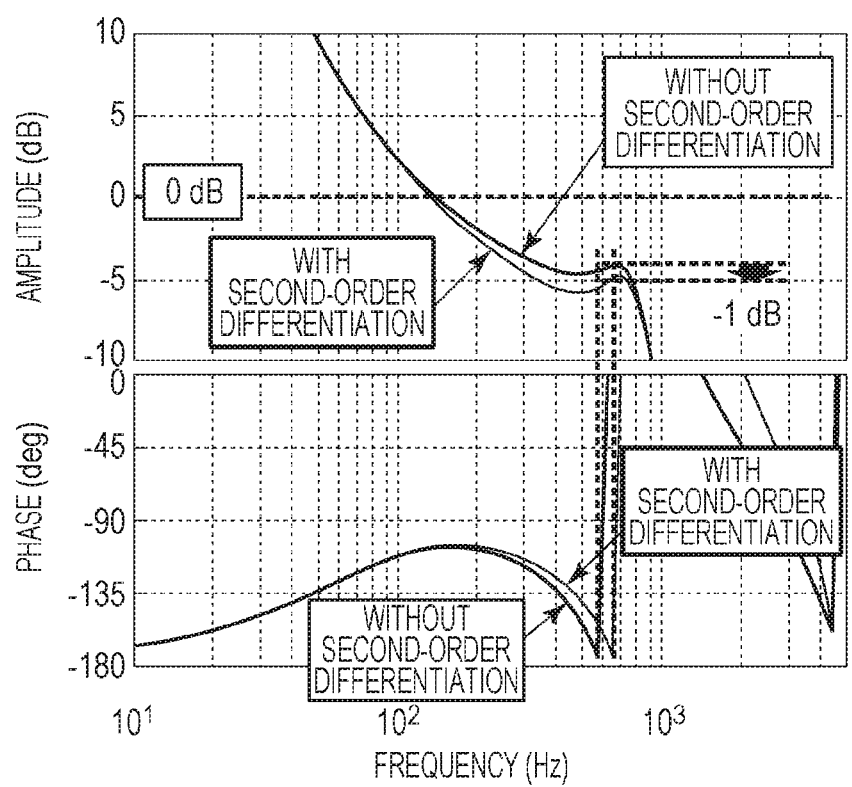
FIG. 11 is a Bode diagram of an open-loop transfer function obtained in cases in which a second-order differentiator is added and is not added to a PID calculation unit.

FIG. 11 is a Bode diagram of an open-loop transfer function obtained in cases in which a second-order differentiator is added and is not added to the PID calculation unit. Cases in which a second-order differentiator is provided and is not provided are compared, and the effect is investigated. FIG. 11 reveals that the gain margin at frequencies at which the phase delay exceeds 180 degrees improves by 1 dB when the second-order differentiator is provided and the stability in a high-frequency range increases. The second derivative gain Gd2 is set to 1.0, and this value is an optimal value. FIG. 11 also reveals that, even when the control gain of the PID calculation unit is changed, a value that is approximately twice the derivative gain Gd is preferable. In principle, the result improves in a higher frequency side when third differentiation and fourth differentiation are added. In reality, however, noise is amplified as the differentiation is repeated, and the cutoff frequency of the filter needs to be lowered, which leads to a controllability deterioration. Therefore, up to the second-order differentiation is employed in the present exemplary embodiment. How many times the differentiation is to be carried out may be determined as appropriate in accordance with the required performance.

Figure 12A:
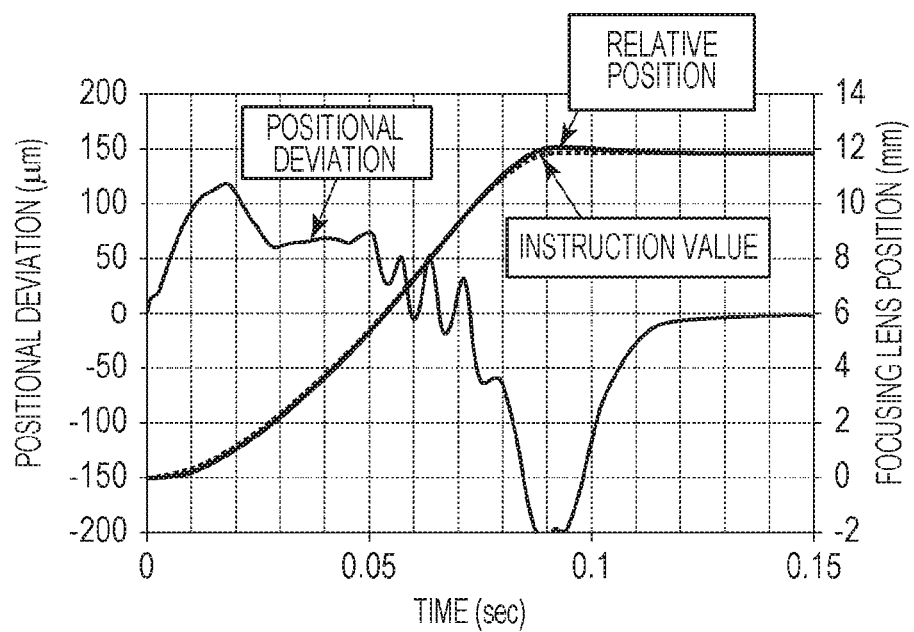
FIGS. 12A and 12B illustrate results of measuring the following accuracy of a lens with respect to an instruction position obtained when a focusing lens is driven by using an example of a control apparatus according to an exemplary embodiment of the present invention.
Figure 12B:
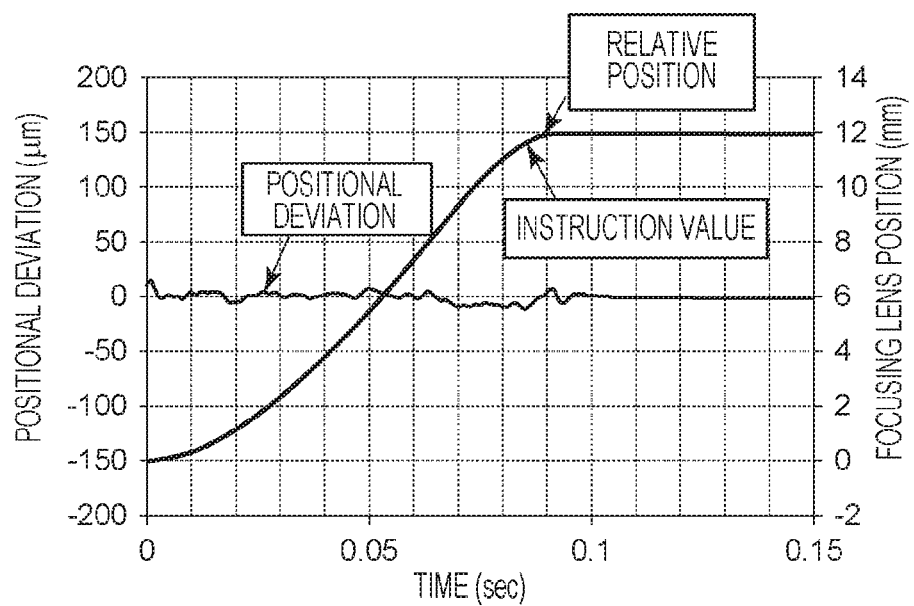

FIGS. 12A and 12B illustrate results of measuring the following accuracy of a lens with respect to an instruction position obtained when a focusing lens is driven by using the control apparatus according to the present exemplary embodiment. The horizontal axis indicates the time, the vertical axis on the right indicates the change in the instruction value and the relative position of the focusing lens, and the vertical axis on the left indicates the positional deviation between the instruction value and the relative position. The positional deviation is an index that indicates the following accuracy with respect to the instruction value at each time point. Here, the driving and stopping operation is carried out under the condition in which the mass of the lens is 8 g, the driving stroke from the start position to the target position is 12 mm, the acceleration and deceleration times are each 16 ms, and the maximum speed is 200 mm/s. In addition, the control is carried out under the condition in which the driving start frequency at the time of the control is 91 kHz, the phase difference is ±120 degrees at a maximum, and the driving voltage is 120 Vpp. The control gains of the PID calculation unit are set as follows: Gp=0.032, Gi=0.0007, Gd=0.5, and Gd2=1.0. In addition, the speed feedforward gain Gv is set to 0.45.

FIG. 12A illustrates the result of the feedback control (configuration of the first comparative example) in which only a conventional PID calculation unit is used. FIG. 12A reveals that a positional deviation of no less than 100 μm occurs in the acceleration and deceleration regions at the time of starting and stopping and the following performance is not sufficient. In addition, a positional deviation of approximately 50 μm occurs in a maximum speed region (intermediate region) as well, and the following delay is large.

FIG. 12B illustrates the result obtained when the control according to the present exemplary embodiment is employed. FIG. 12B reveals that the following accuracy of no greater than 10 μm is achieved in the entire region when the control apparatus according to the present exemplary embodiment is used, as compared to the case in which a conventional control apparatus is used.

Second Exemplary Embodiment

Next, other exemplary embodiments of a control apparatus for a vibration-type actuator will be described. In a first configuration example, only the phase difference is subjected to feedforward control. In a second configuration example, feedforward amounts for the phase difference and the frequency are adjusted individually. The configurations of the two examples are both based on the configuration of the first exemplary embodiment, and the two examples are modifications of the first exemplary embodiment. Thus, descriptions of the configurations, the functions, and the effects that are similar to those of the first exemplary embodiment will be omitted. The two configuration examples will be described in detail, hereinafter.

Figure 13:
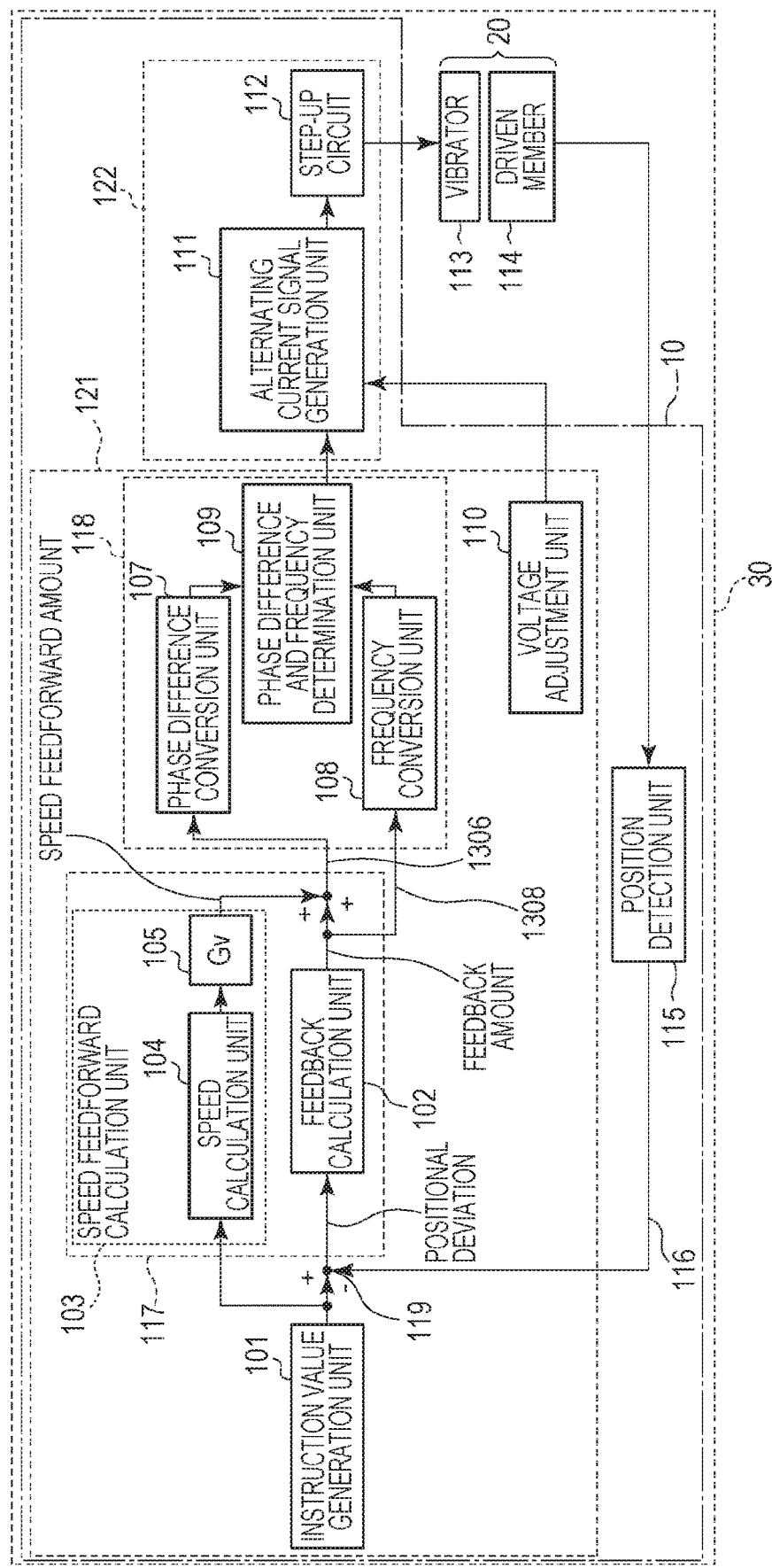
FIG. 13 illustrates an example of a control apparatus for a vibration-type actuator according to a second exemplary embodiment of the present invention, in which only the phase difference of a two-phase driving signal is subjected to feedforward control.

FIG. 13 illustrates a control apparatus for a vibration-type actuator according to a second exemplary embodiment of the present invention, and the control apparatus carries out feedforward control only on the phase difference of a two-phase driving signal. As illustrated in FIG. 13, a phase difference control amount (1306) is a value obtained by adding a calculated amount from a feedback calculation unit 102 and a calculated amount from a feedforward calculation unit 103. Meanwhile, the calculated amount from the feedback calculation unit 102 is used directly as a frequency control amount (1308). Thus, only the elliptic ratio of the elliptical motion and the driving direction are controlled by the feedforward calculation unit 103 and the feedback calculation unit 102, and the elliptic amplitude is subjected to the frequency control of only the feedback calculation unit 102.

Figure 14:
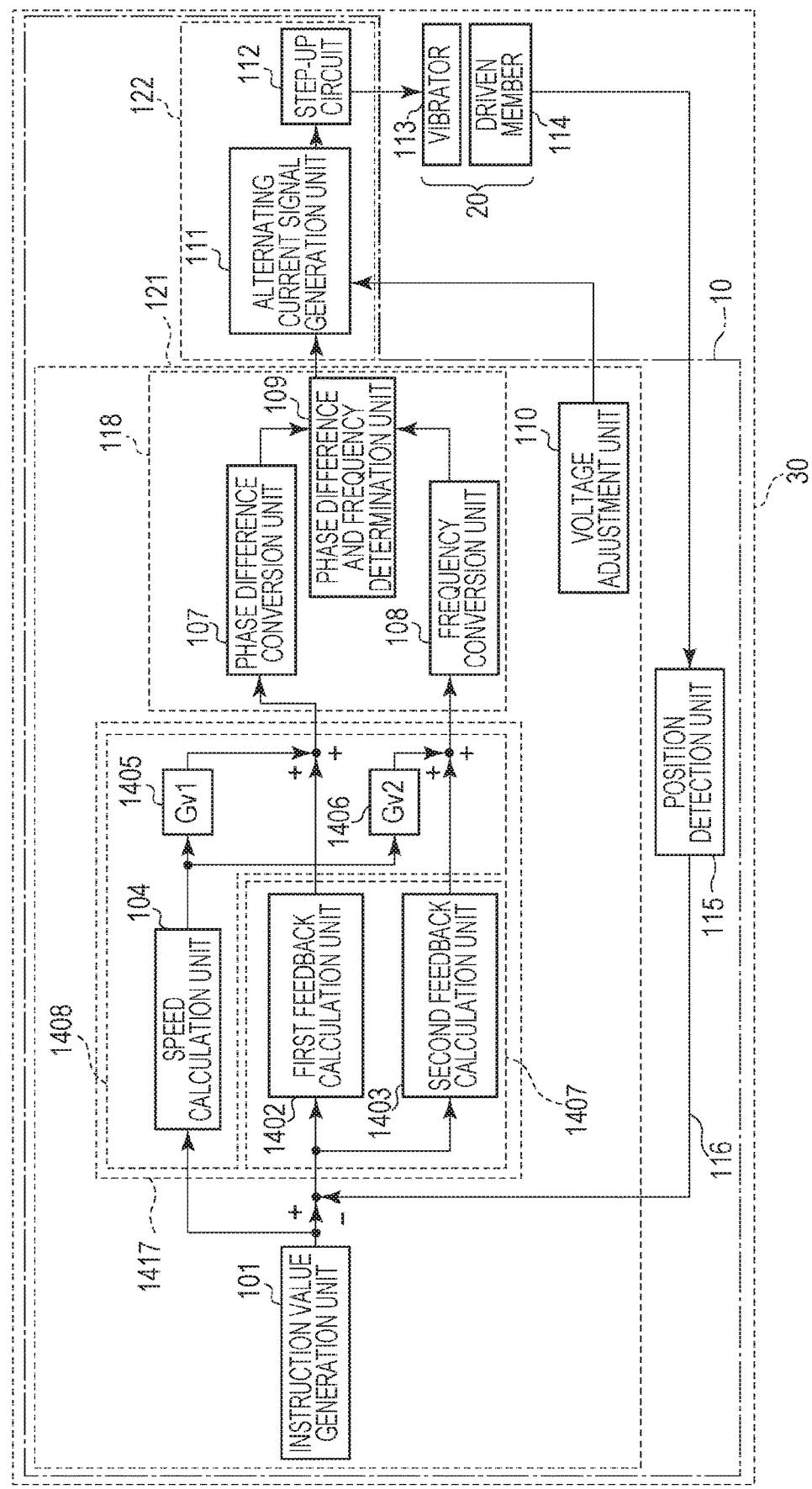
FIG. 14 illustrates another example of a control apparatus for a vibration-type actuator according to the second exemplary embodiment of the present invention, in which feedforward amounts are adjusted individually for the phase difference and the frequency.

FIG. 14 illustrates a second example of a control apparatus for a vibration-type actuator according to the second exemplary embodiment of the present invention, and the control apparatus adjusts feedforward amounts individually for the phase difference and the frequency. A control amount calculation unit 1417 includes a feedback calculation unit 1407 and a speed feedforward calculation unit 1408. The feedback calculation unit 1407 includes a first feedback calculation unit 1402 for controlling the phase difference and a second feedback calculation unit 1403 for controlling the frequency, and the first feedback calculation unit 1402 and the second feedback calculation unit 1403 are provided separately from each other. The control gains of the first and second feedback calculation units may be the same or may be individually adjusted on the basis of the difference between the transfer function for the phase difference and the transfer function for the frequency.

Meanwhile, the feedforward calculation unit 1408 includes a multiplier 1405 configured to multiply an output of a speed calculation unit 1404 by a gain Gv1 for controlling the phase difference, and a multiplier 1406 configured to multiply an output of the speed calculation unit 1404 by a gain Gv2 for controlling the frequency. Thus, by adjusting Gv1 and Gv2 individually, the feedforward amounts of the elliptic ratio and the elliptic amplitude can each be adjusted.

Figure 15A:
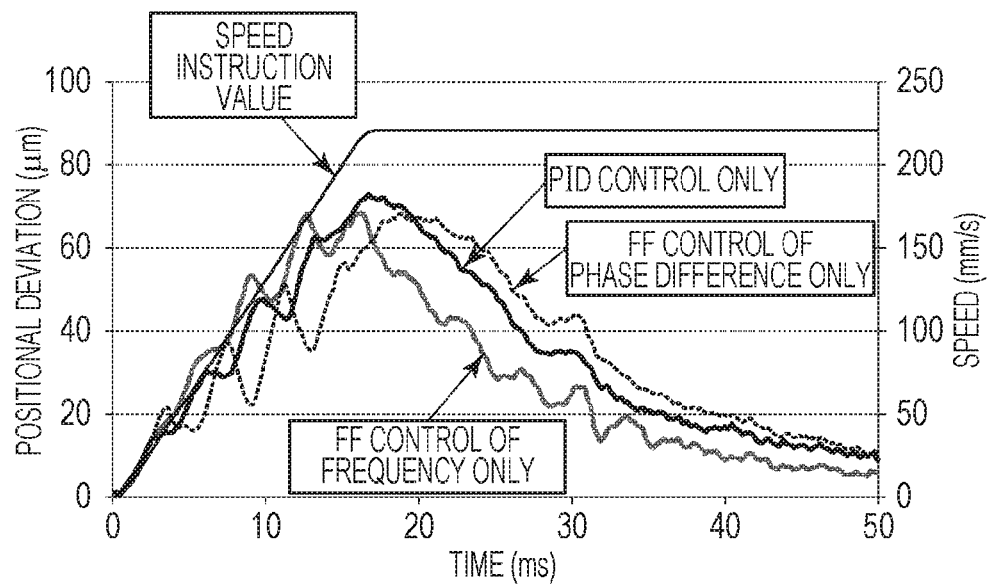
FIGS. 15A and 15B illustrate results of measuring the following accuracy with respect to an instruction position obtained when a control apparatus according to the second exemplary embodiment is driven with a load placed on a contact member.
Figure 15B:
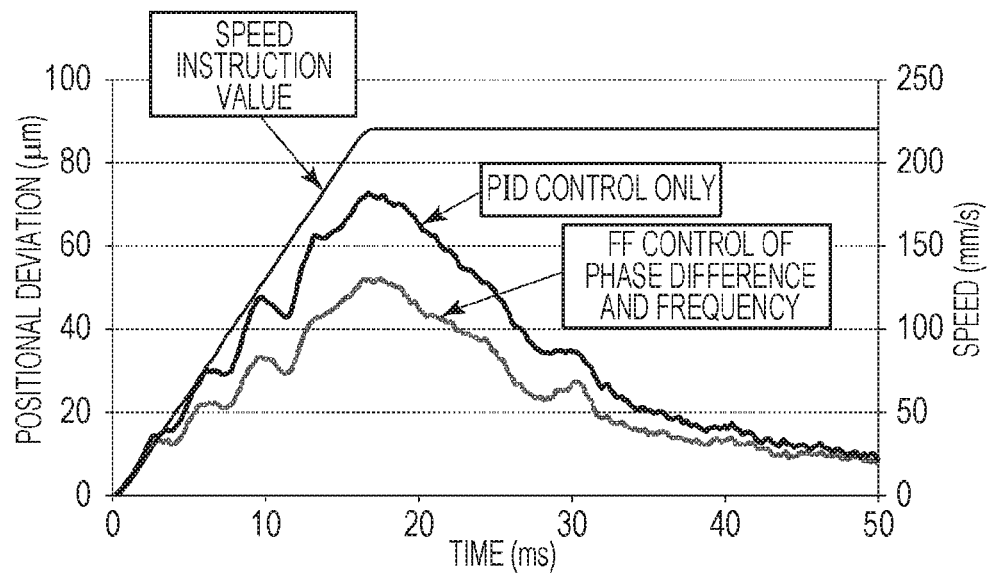

FIGS. 15A and 15B illustrate results of measuring the following accuracy with respect to an instruction position obtained when a load of 34 gf is placed on a contact member by using a control apparatus according to the second exemplary embodiment. The horizontal axis indicates the time, the vertical axis on the right indicates the speed instruction value, and the vertical axis on the left indicates the positional deviation of the relative position of the contact member with respect to the instruction position. The positional deviation is an index that indicates the following accuracy with respect to the instruction value at each time point. Here, the driving and stopping operation is carried out under the condition in which the acceleration time is 16 ms and the maximum speed is 216 mm/s. FIGS. 15A and 15B illustrate, in enlargement, a region in which the acceleration time is 16 ms and a region in which the maximum speed has been achieved. The control is carried out under the condition in which the driving start frequency at the time of the control is 97 kHz, the phase difference is ±110 degrees at a maximum, and the driving voltage is 120 Vpp.

FIG. 15A illustrates the results of measuring the following accuracy with respect to the instruction position in cases in which feedforward control is carried out only by the PID calculation unit, only the phase difference is subjected to feedforward control, and only the frequency is subjected to feedforward control. Here, the control gains of the PID calculation unit are set as follows: Gp=0.64, Gi=0.003, and Gd=0.53. In addition, the speed feedforward gain Gv is set to 0.5. When only the phase difference is subjected to the feedforward control, the following accuracy improves in the acceleration region from the start. In the meantime, when only the frequency is subjected to the feedforward control, the following accuracy improves after the maximum speed has been achieved. The reason for this is that a low-speed region is controlled through the phase difference and a high-speed region is controlled through the frequency.

FIG. 15B illustrates a comparison between a case in which the feedback control is carried out only by the PID calculation unit and a case in which the phase difference and the frequency are individually subjected to feedforward control. Here, the control gains of the PID calculation unit are set to the same values as those described with reference to FIG. 15A. The speed feedforward gain Gv1 for controlling the phase difference is set to 0.5, and the speed feedforward gain Gv2 for controlling the frequency control is set to 0.005. When the phase difference and the frequency are individually subjected to the feedforward control, the following accuracy improves in the entire region.

As described thus far, according to the present exemplary embodiment, a feedforward control method for a vibration-type actuator that can follow at high speed even when the acceleration or deceleration is carried out in a short period of time can be achieved.

Third Exemplary Embodiment

In the first and second exemplary embodiments, the control apparatus for the vibration-type actuator has been described with an example in which the control apparatus is used to drive a lens for autofocusing in an image pickup apparatus, but an application example of the present invention is not limited thereto. For example, as illustrated in FIGS. 16A and 16B, the control apparatus can also be used to drive a lens or an image pickup element for camera shake compensation. FIG. 16A is a plan view (top view) illustrating the external appearance of an image pickup apparatus 60. FIG. 16B is a schematic diagram illustrating the internal structure of the image pickup apparatus 60.

The image pickup apparatus 60 is generally constituted by a main body 61 and a lens barrel 62 that can be attached to or detached from the main body 61. The main body 61 is provided with an image pickup element 63, such as a charge-coupled device (CCD) sensor or a complementary metal-oxide semiconductor (CMOS) sensor, that converts an optical image in which light that has passed through the lens barrel 62 is imaged to an image signal and a camera control microcomputer 64 that controls the operation of the image pickup apparatus 60 as a whole. A plurality of lenses L, such as a focusing lens and a zoom lens, are disposed at predetermined positions in the lens barrel 62. In addition, an image blur correction device 50 is embedded in the lens barrel 62. The image blur correction device 50 includes a disc member 56 and a vibrator 113 provided on the disc member 56, and an image blur correction lens 65 is disposed in a hole portion formed at the center of the disc member 56. The image blur correction device 50 is disposed such that the image blur correction lens 65 can be moved along a plane orthogonal to the optical axis of the lens barrel 62. In this case, by driving the vibrator 113 with the use of a control apparatus 10 according to an exemplary embodiment of the present invention, the vibrator 113 or the disc member 56 moves relative to a contact member 114 fixed to the barrel, and the correction lens is driven.

In addition, a control apparatus according to an exemplary embodiment of the present invention can also be used to drive a lens holder for moving a zoom lens. Thus, a control apparatus according to an exemplary embodiment of the present invention can be mounted to a replacement lens, aside from an image pickup apparatus, for driving a lens.

In addition, the control apparatus for the vibration-type actuator described in the first and second exemplary embodiments can also be used to drive an automatic stage. For example, as illustrated in FIG. 17, the control apparatus can be used to drive an automatic stage of a microscope.

Figure 17:
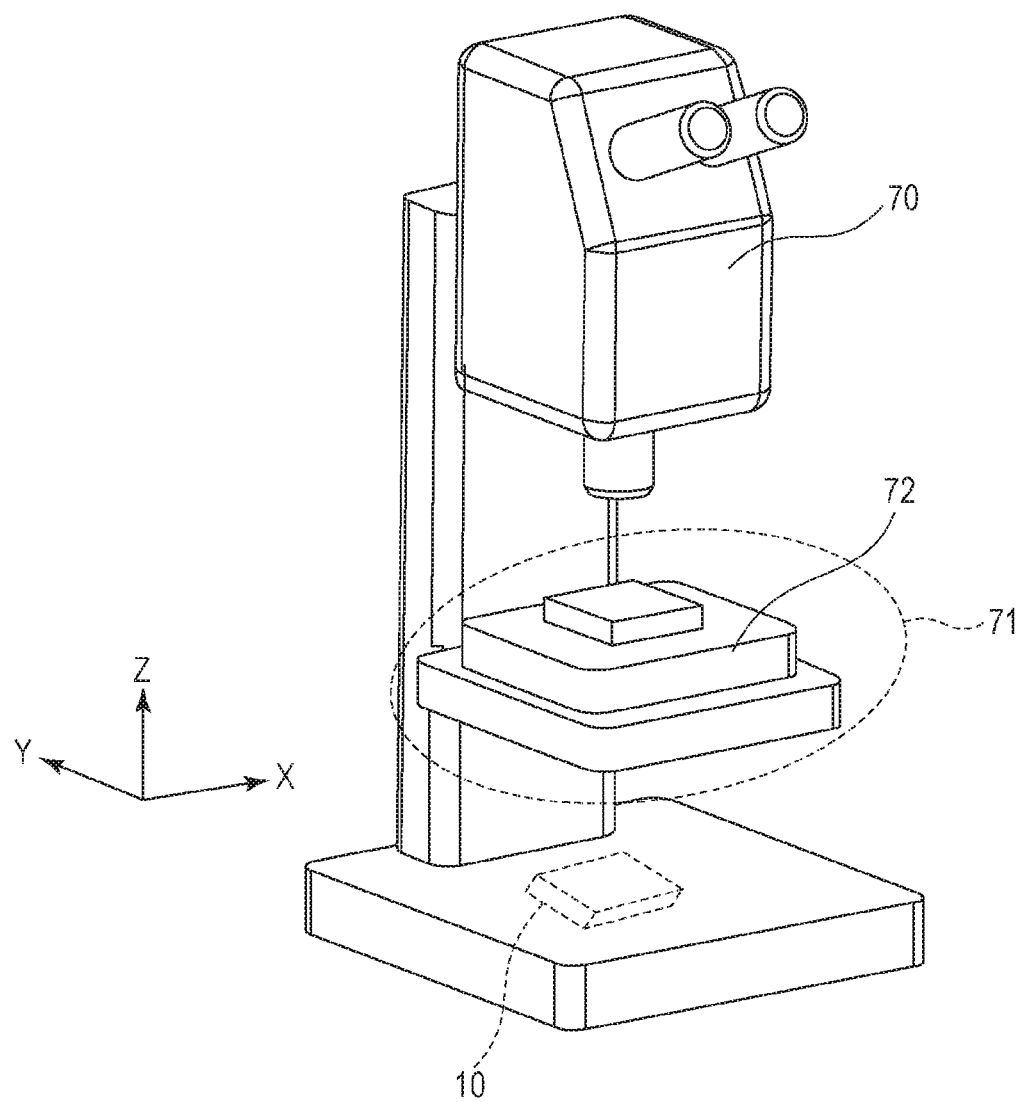
FIG. 17 illustrates an external appearance of a microscope serving as another application example of a control apparatus according to an exemplary embodiment of the present invention.

The microscope illustrated in FIG. 17 includes an image pickup unit 70 that includes an image pickup element and an optical system, and an automatic stage 71 including a stage 72 that is provided on a base plate and that is moved by the vibration-type actuator. An object to be observed is placed on the stage 72, and an enlarged image is captured by the image pickup unit 70. When an observation range is broad, the stage 72 is moved by driving the vibration-type actuator with the use of the control apparatus 10 according to the first or second exemplary embodiment. Thus, the object to be observed is moved in the X-direction or the Y-direction indicated in FIG. 17, and a number of images are captured. The captured images are combined by a computer (not illustrated), and a high-definition single image of a broad observation range can be acquired.

An aspect of the present invention provides a method of controlling a vibration-type actuator in which a vibrator is driven so as to change a relative position of the vibrator and a contact member. The stated method includes the steps of: obtaining a feedback amount obtained on the basis of a difference between the relative position of the vibrator and the contact member and an instruction value pertaining to the relative position; obtaining a speed feedforward amount from a change over time in the instruction value; and generating a signal containing information for controlling at least one of an elliptic ratio of elliptical motion generated in a driving unit of the vibrator and a driving direction of the vibrator by adding the feedback amount and the speed feedforward amount.

Another aspect of the present invention provides a control apparatus for a vibration-type actuator. The stated control apparatus includes a control unit configured to generate a signal containing information for controlling at least one of an elliptic ratio of elliptical motion generated in a driving unit of a vibrator and a driving direction of the vibrator by adding a feedback amount that is based on a difference between a relative position of the vibrator and a contact member and an instruction value pertaining to the relative position and a speed feedforward amount that is obtained from a change over time in the instruction value. The relative position of the vibrator and the contact member can be changed by driving the vibrator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140857 filed Jul. 14, 2015, which is hereby incorporated by reference herein in its entirety.

What is claimed is:

1. A control apparatus for a vibration-type actuator, the control apparatus comprising:
   an instruction value generation unit configured to generate an instruction value for a first relative position of a vibrator and a contact member;
   a position detection unit configured to detect a second relative position of the vibrator and the contact member; and
   a control unit configured to generate a signal containing information for controlling the vibrator by adding a feedback amount and a speed feedforward amount,
   wherein
   the feedback amount is obtained based on at least one of integration processing and differentiation processing based on a difference between the first relative position of the vibrator and the contact member and the second relative position of the vibrator and the contact member, and
   the speed feedforward amount is obtained based on a change over time based on the first relative position, and
   wherein the second relative position can be changed by driving the vibrator.

2. The control apparatus for a vibration-type actuator according to claim 1,
   wherein the vibrator is configured such that the second relative position is changed by elliptical motion generated in a driving unit of the vibrator by applying an alternating current signal to the vibrator.

3. The control apparatus for a vibration-type actuator according to claim 1,
   wherein the control unit includes:
       a feedback calculation unit configured to obtain the feedback amount;
       a speed feedforward calculation unit configured to obtain the speed feedforward amount; and
       an adder configured to output a control amount by adding the feedback amount and the speed feedforward amount.

4. The control apparatus for a vibration-type actuator according to claim 3,
   wherein the speed feedforward calculation unit includes:
       a speed calculation unit configured to take a time derivative of the first relative position and output the time derivative; and
       a multiplier configured to multiply an output of the speed calculation unit by a speed feedforward gain.

5. The control apparatus for a vibration-type actuator according to claim 3, wherein Gv and Gd satisfy the following formula:

$$Gv \le Gd,$$

wherein the Gv represents a speed feedforward gain of the speed feedforward calculation unit and the Gd represents a derivative gain of the feedback calculation unit.

6. The control apparatus for a vibration-type actuator according to claim 3,
wherein the feedback calculation unit further includes an acceleration calculation unit constituted by a second derivative term.

7. The control apparatus for a vibration-type actuator according to claim 3,
wherein the control unit includes a control parameter generation unit configured to generate a control parameter on the basis of the control amount.

8. The control apparatus for a vibration-type actuator according to claim 7,
wherein the control parameter is at least one of a frequency and a phase.

9. The control apparatus for a vibration-type actuator according to claim 3,
wherein a driving unit configured to generate an alternating current signal to be applied to the vibrator on the basis of an output of the control unit is provided.

10. The control apparatus for a vibration-type actuator according to claim 9,
wherein the driving unit includes an alternating current signal generation unit configured to generate an alternating current signal that has one of a phase and a frequency set on the basis of the control amount.

11. A driving apparatus, comprising:
the control apparatus for a vibration-type actuator according to claim 1; and
the vibration-type actuator.

12. A replacement lens, comprising:
a lens; and
the control apparatus for a vibration-type actuator according to claim 1 configured to drive the lens by driving the contact member.

13. An image pickup apparatus, comprising:
an image pickup element;
a lens; and
the control apparatus for a vibration-type actuator according to claim 1 configured to drive the lens by driving the contact member.

14. An automatic stage, comprising:
a stage; and
the control apparatus for a vibration-type actuator according to claim 1 configured to drive the stage by driving the contact member.

15. The control apparatus for a vibration-type actuator according to claim 1,
wherein the feedback amount and the speed feedforward amount are obtained in each cycle.

16. The control apparatus for a vibration-type actuator according to claim 1,
wherein a vibration of the vibrator is controlled by a driving signal generated based on the signal containing information for controlling the vibrator such that the second relative position can be changed by driving the vibrator.

17. A control apparatus for a vibration-type actuator, the control apparatus comprising:
an instruction value generation unit configured to generate an instruction value for a first relative position of a vibrator and a contact member;
a position detection unit configured to detect a second relative position of the vibrator and the contact member; and
a control unit configured to generate a signal containing information for controlling at least one of an elliptic ratio of elliptical motion generated in the vibrator and a direction in which the second relative position is changeable by adding a feedback amount and a speed feedforward amount,
wherein
the feedback amount is obtained based on a differences between the first relative positions of the vibrator and the contact member and the second relative positions of the vibrator and the contact member, and
the speed feedforward amount is obtained based on a change over time based on the first relative position, and
wherein the second relative position can be changed by driving the vibrator.

18. The control apparatus for a vibration-type actuator according to claim 17,
wherein the feedback amount is generated by a feedback calculation unit configured to carry out at least one of integration processing and differentiation processing.

19. The control apparatus for a vibration-type actuator according to claim 17,
wherein the control unit includes:
a feedback calculation unit configured to obtain the feedback amount;
a speed feedforward calculation unit configured to obtain the speed feedforward amount; and
an adder configured to output a control amount by adding the feedback amount and the speed feedforward amount.

20. The control apparatus for a vibration-type actuator according to claim 19,
wherein the speed feedforward calculation unit includes:
a speed calculation unit configured to take a time derivative of the first relative position and output the time derivative; and
a multiplier configured to multiply an output of the speed calculation unit by a speed feedforward gain.

21. The control apparatus for a vibration-type actuator according to claim 19,
wherein Gv and Gd satisfy a following formula:

$$Gv \le Gd,$$

wherein the Gv represents a speed feedforward gain of the speed feedforward calculation unit and the Gd represents a derivative gain of the feedback calculation unit.

22. The control apparatus for a vibration-type actuator according to claim 19,
wherein the feedback calculation unit further includes an acceleration calculation unit constituted by a second derivative term.

23. The control apparatus for a vibration-type actuator according to claim 19,
wherein the control unit includes a control parameter generation unit configured to generate a control parameter on the basis of the control amount.

24. The control apparatus for a vibration-type actuator according to claim 23,
wherein the control parameter is at least one of a frequency and a phase.

25. The control apparatus for a vibration-type actuator according to claim 19, wherein a driving unit configured to generate an alternating current signal to be applied to the vibrator on the basis of an output of the control unit is provided.

26. The control apparatus for a vibration-type actuator according to claim 25,
wherein the driving unit includes an alternating current signal generation unit configured to generate an alternating current signal that has one of a phase and a frequency set on the basis of the control amount.

27. A driving apparatus, comprising:
the control apparatus for a vibration-type actuator according to claim 17; and
the vibration-type actuator.

28. A replacement lens, comprising:
a lens; and
the control apparatus for a vibration-type actuator according to claim 17 configured to drive the lens by driving the contact member.

29. An image pickup apparatus, comprising:
an image pickup element;
a lens; and
the control apparatus for a vibration-type actuator according to claim 17 configured to drive the lens by driving the contact member.

30. An automatic stage, comprising:
a stage; and
the control apparatus for a vibration-type actuator according to claim 17 configured to drive the stage by driving the contact member.

31. The control apparatus for a vibration-type actuator according to claim 17,
wherein the elliptic ratio is a ratio of a component in the direction in which the second relative position is changeable to a component in a direction in which the vibrator and the contact member come into pressure-contact with each other in the elliptic motion.

32. The control apparatus for a vibration-type actuator according to claim 17,
wherein the feedback amount and the speed feedforward amount are obtained in each cycle.

33. The control apparatus for a vibration-type actuator according to claim 17,
wherein a vibration of the vibrator is controlled by a driving signal generated based on the signal containing information for controlling at least one of the elliptic ratio and a direction in which the second relative position is changeable such that the second relative position can be changed by driving the vibrator.

* * * * *